(12) United States Patent
Uehara et al.

(10) Patent No.: US 12,188,557 B2
(45) Date of Patent: Jan. 7, 2025

(54) POWER TRANSMISSION DEVICE

(71) Applicant: JATCO LTD, Fuij (JP)

(72) Inventors: Hiroki Uehara, Kanagawa (JP);
Masumi Fujikawa, Kanagawa (JP);
Toshikazu Oshidari, Kanagawa (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 17/428,553

(22) PCT Filed: Nov. 26, 2019

(86) PCT No.: PCT/JP2019/046055
§ 371 (c)(1),
(2) Date: Aug. 4, 2021

(87) PCT Pub. No.: WO2020/161996
PCT Pub. Date: Aug. 13, 2020

(65) Prior Publication Data
US 2022/0136601 A1 May 5, 2022

(30) Foreign Application Priority Data
Feb. 8, 2019 (JP) .................................. 2019-022145

(51) Int. Cl.
*F16D 67/00* (2006.01)
*B60K 1/00* (2006.01)
(Continued)

(52) U.S. Cl.
CPC .......... *F16H 63/3003* (2013.01); *B60K 1/00* (2013.01); *B60K 17/046* (2013.01); *B60K 17/08* (2013.01);
(Continued)

(58) Field of Classification Search
CPC ......... F16H 63/3003; F16H 2200/2005; F16H 2200/2035; F16H 2200/0034–0095; F16H 3/52–64; B60K 2001/001; B60K 17/046
See application file for complete search history.

(56) References Cited

U.S. PATENT DOCUMENTS 2,409,506 A 9/1943 McFarland
2,576,336 A * 11/1951 Farkas ................ F16H 61/0269
475/56

(Continued)

FOREIGN PATENT DOCUMENTS

DE 102015106503 A1 * 11/2015 ............... B60K 1/00
DE 10 2017 111 051 B3 6/2018
(Continued)

*Primary Examiner* — Ernesto A Suarez
*Assistant Examiner* — Lillian T Nguyen
(74) *Attorney, Agent, or Firm* — Global IP Counselors, LLP

(57) ABSTRACT

A power transmission device includes a transmission mechanism including a planetary gear set, a first engagement element, and a second engagement element. The first engagement element is a band brake configured to be engaged when the transmission mechanism is in a low gear speed. The second engagement element is a multi-plate friction clutch configured to be engaged when the transmission mechanism is in a high gear speed. The multi-plate friction clutch includes a driven plate and a drive plate. The band brake overlaps with the driven plate and the drive plate of the multi-plate friction clutch in a radial direction.

3 Claims, 10 Drawing Sheets

(51) Int. Cl.
  *B60K 17/04* (2006.01)
  *B60K 17/08* (2006.01)
  *F16D 25/0638* (2006.01)
  *F16H 63/30* (2006.01)
(52) U.S. Cl.
  CPC .... *F16D 25/0638* (2013.01); *B60K 2001/001* (2013.01); *F16H 2200/0021* (2013.01); *F16H 2200/0034* (2013.01); *F16H 2200/2005* (2013.01); *F16H 2200/2035* (2013.01)

(56) References Cited

U.S. PATENT DOCUMENTS

| | | | | |
|---|---|---|---|---|
| 2,886,983 | A * | 5/1959 | Miller | F16H 47/08 475/276 |
| 6,120,410 | A | 9/2000 | Taniguchi et al. | |
| 6,415,685 | B1 * | 7/2002 | Taniguchi | F16H 57/02 74/606 R |
| 6,968,934 | B2 * | 11/2005 | Yamamura | F16H 63/3026 475/159 |
| 9,228,641 | B2 * | 1/2016 | Gauthier | F16H 61/686 |
| 2004/0242368 | A1 * | 12/2004 | Tabata | F16H 3/666 475/296 |
| 2007/0184932 | A1 | 8/2007 | Tabata et al. | |
| 2007/0218786 | A1 * | 9/2007 | Tamba | B63H 23/02 440/86 |
| 2009/0215579 | A1 * | 8/2009 | Phillips | F16H 3/66 475/276 |
| 2013/0260948 | A1 * | 10/2013 | Ando | F16H 3/66 475/276 |
| 2014/0080653 | A1 * | 3/2014 | Smetana | F16H 3/54 475/150 |
| 2015/0330492 | A1 * | 11/2015 | Lee | F16H 37/0813 475/331 |
| 2015/0361539 | A1 * | 12/2015 | Heitzenrater | F16D 49/08 192/66.1 |
| 2019/0344660 | A1 * | 11/2019 | Kumar | B60K 17/04 |

FOREIGN PATENT DOCUMENTS

| | | | | |
|---|---|---|---|---|
| EP | 2511569 | A1 * | 10/2012 | ............... B60K 1/00 |
| JP | S49-011788 | Y1 | 3/1974 | |
| JP | H05-263883 | A | 10/1993 | |
| JP | 2000-220705 | A | 8/2000 | |
| JP | 2005-273768 | A | 10/2005 | |
| JP | 2018-118616 | A | 8/2018 | |

* cited by examiner

POWER TRANSMISSION DEVICE

CROSS-REFERENCE TO RELATED APPLICATIONS

This is a U.S. national phase application of PCT/JP2019/046055, filed on Nov. 26, 2019, which claims priority to Japanese Patent Application No. 2019-022145, filed on Feb. 8, 2019. The entire disclosure of Japanese Patent Application No. 2019-022145 is hereby incorporated herein by reference.

TECHNICAL FIELD

The present invention relates to a power transmission device.

BACKGROUND ART

Disclosed in Japanese Laid-Open Patent Publication No. 2018-118616 is a stepped transmission mechanism that switches between low gear speed and high gear speed by switching using a meshing type engagement device.

With the stepped transmission mechanism of Japanese Laid-Open Patent Publication No. 2018-118616, for example when the high gear speed is selected, when a vehicle equipped with a stepped transmission stops, in preparation for the vehicle to start, the gear shift position needs to be switched to the low gear speed.

SUMMARY

However, at the point when stopped, if there is a skew between the spline phase of the high gear speed side and the spline phase of the low gear speed side, there may be cases when the engagement destination of the transmission switching member engaged with the spline on the high gear speed side cannot be switched to the spline of the low gear speed side.

In such a case, while the vehicle is stopped, it is not possible to switch the gear shift position to the low gear speed.

The present invention was created considering the above-mentioned problem, so the purpose is to provide a power transmission device that can appropriately switch the gear shift position from the high gear speed to the low gear speed when the vehicle is stopped.

One embodiment of the present disclosure is directed to a power transmission device having a transmission mechanism that has a planetary gear set, a first engagement element, and a second engagement element, wherein the first engagement element is a band brake that is engaged when the transmission mechanism is in the low gear speed, and the second engagement element is a multi-plate friction clutch that is engaged when the transmission mechanism is in the high gear speed.

According to the embodiment, it is possible to appropriately switch the gear shift position from the high gear speed to the low gear speed when the vehicle equipped with the power transmission device is stopped.

DETAILED DESCRIPTION OF EMBODIMENTS

First Embodiment

Following, a first embodiment of the present invention is explained.

Figure 1:
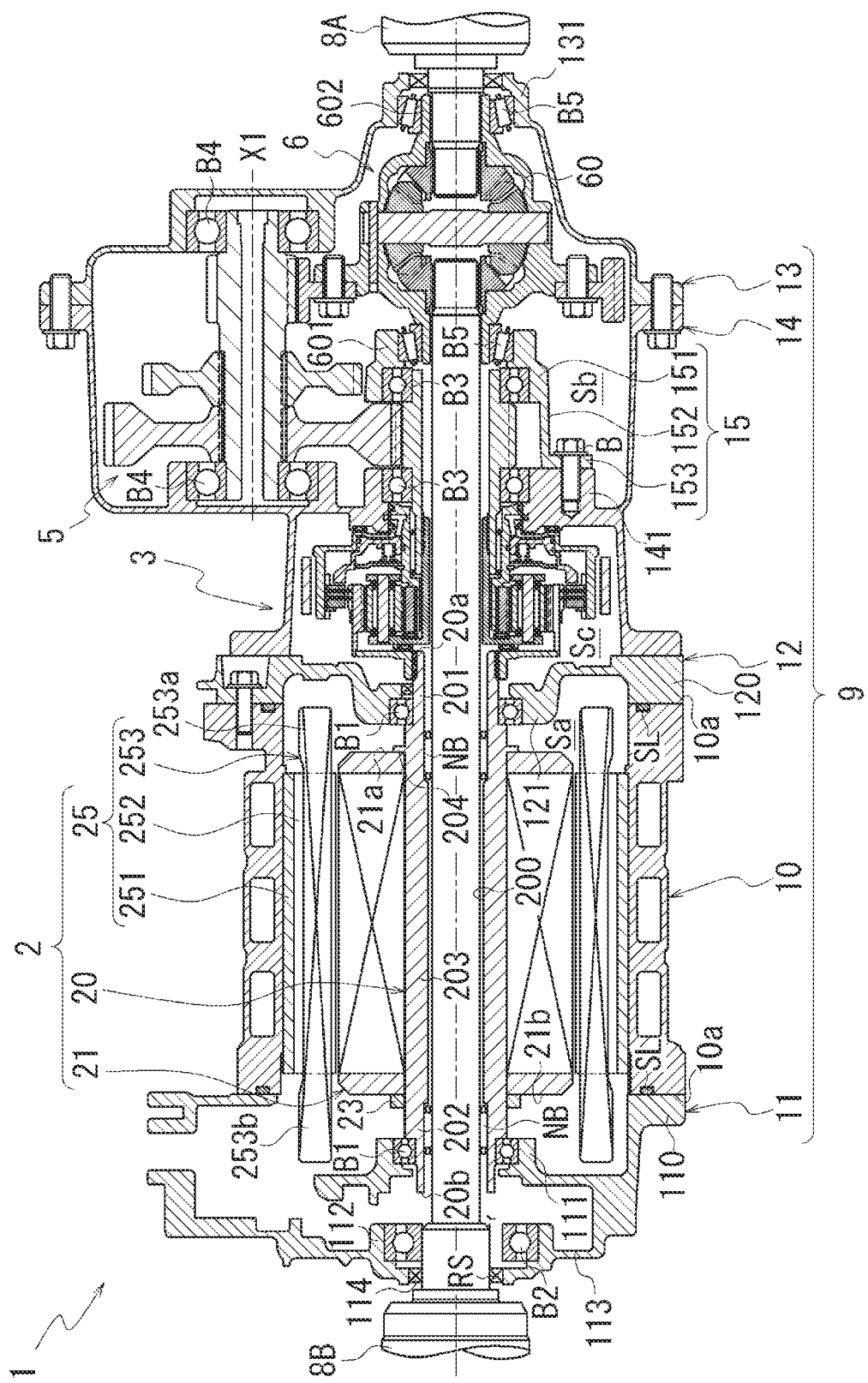
FIG. 1 is a drawing for explaining a power transmission device of a first embodiment.

FIG. 1 is a drawing for explaining a power transmission device 1 of the first embodiment.

Figure 2:
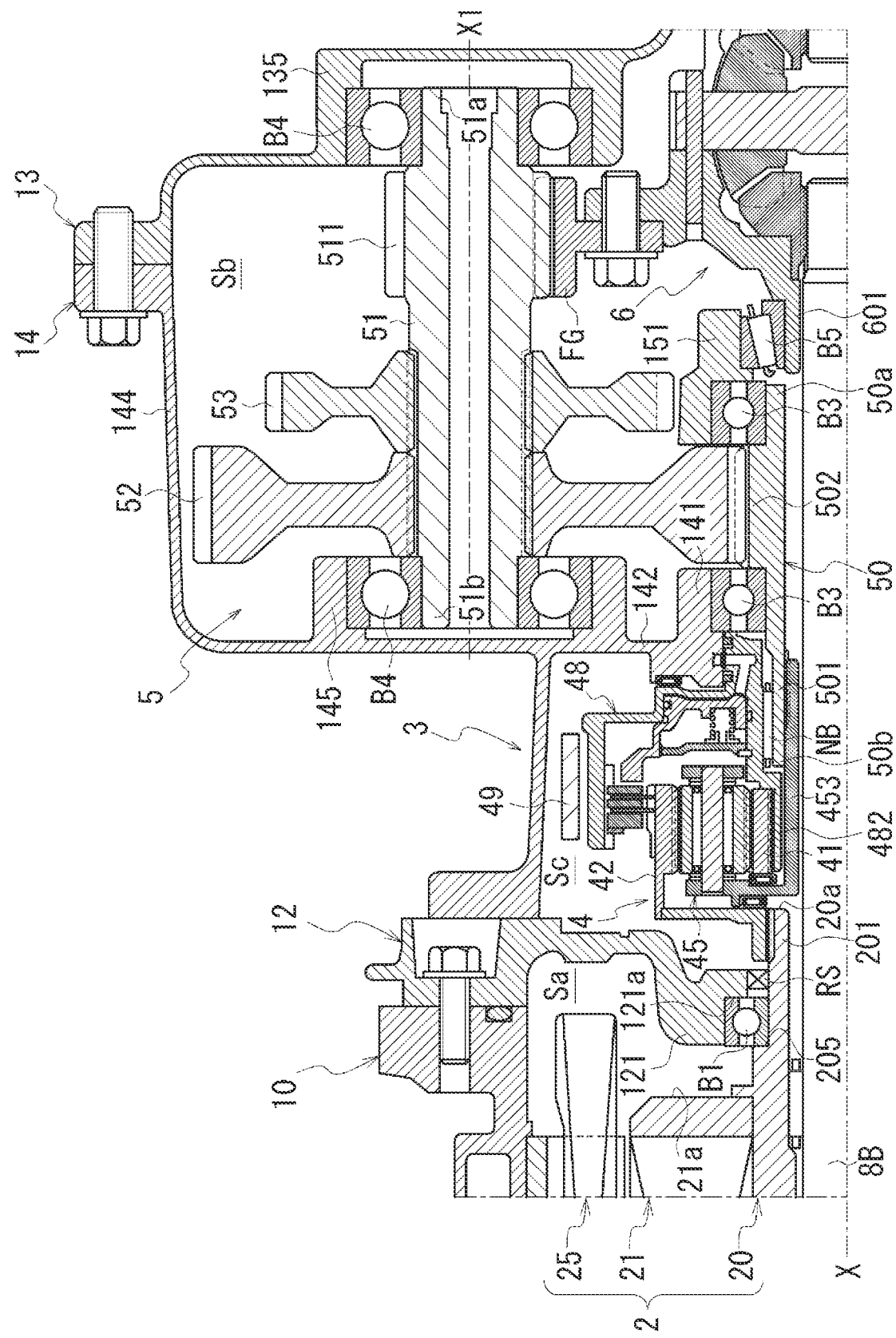
FIG. 2 is an enlarged view of the range from a motor of the power transmission device to a counter gear.

FIG. 2 is an enlarged view around a counter gear 5 of the power transmission device 1.

As shown in FIG. 1, the power transmission device 1 has a motor 2, a transmission mechanism 3, a counter gear 5 that transmits the output rotation of the transmission mechanism 3 to a differential device 6, and the differential device 6 that transmits the transmitted rotation to drive shafts 8 (8A, 8B).

With the power transmission device 1, the transmission mechanism 3, the counter gear 5, the differential device 6, and the drive shafts 8 (8A, 8B) are provided along the transmission route of the output rotation of the motor 2.

After being shifted by the transmission mechanism 3, the output rotation of the motor 2 is reduced by the counter gear 5, and transmitted to the differential device 6. With the differential device 6, the transmitted rotation is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the transmission mechanism 3 is connected downstream of the motor 2, the counter gear 5 is connected downstream of the transmission mechanism 3, the differential device 6 is connected downstream of the counter gear 5, and the drive shafts 8 (8A, 8B) are connected downstream of the differential device 6.

With the present embodiment, a body case 9 of the power transmission device 1 is constituted by a motor housing 10, an outer cover 11, an inner cover 12, an outer case 13, and an inner case 14.

A case (first case member) of the motor 2 is constituted by the motor housing 10, the outer cover 11, and the inner cover 12.

A case (second case member) that houses the counter gear 5 and the differential device 6 is constituted by the outer case 13 and the inner case 14.

Here, a space Sa formed between the outer cover 11 and the inner cover 12 on the inner diameter side of the motor housing 10 serves as the motor chamber that houses the motor 2.

As shown in FIG. 2, the space formed between the outer case 13 and the inner case 14 is partitioned into a space Sb that houses the counter gear 5 and the differential device 6, and a space Sc that houses the transmission mechanism 3, by a partition wall 142 provided in the inner case 14.

Thus, the space Sb serves as a first gear chamber that houses the counter gear 5 and the differential device 6, and the space Sc serves as a second gear chamber that houses the transmission mechanism 3.

As shown in FIG. 1, the motor 2 has: a cylindrical motor shaft 20; a cylindrical rotor core 21 externally fitted on the motor shaft 20; and a stator core 25 that surrounds the outer circumference of the rotor core 21 with a prescribed gap.

The motor shaft 20 is a cylindrical member that has an insertion hole 200 for the drive shaft 8B, and the motor shaft 20 is externally fitted on the drive shaft 8B.

With the insertion hole 200 of the motor shaft 20, a linking part 201 of one end 20a side in the longitudinal direction, and a supported part 202 of another end 20b side are formed with an inner diameter that is larger than an intermediate area 203 between the linking part 201 and the supported part 202 in the rotation axis X direction.

The inner circumference of the linking part 201 and the inner circumference of the supported part 202 are supported by needle bearings NB, NB that are externally fitted on the drive shaft 8B.

In this state, the motor shaft 20 is provided to be able to rotate relatively with respect to the drive shaft 8B.

As shown in FIG. 2, with the motor shaft 20, a bearing B1 is externally fitted and fixed to the outer circumference of a position separated to the other end 20b side (left side in the drawing) from the one end 20a.

Movement of the bearing B1 to the rotor core 21 side (left side in the drawing) is regulated by a step part 205 provided at the outer circumference of the motor shaft 20.

The outer circumference of the bearing B1 is supported by a motor support unit 121 positioned at the inner diameter side of the inner cover 12. In this state, movement of the bearing B1 to the side opposite to the rotor core 21 (right side in the drawing) is regulated by a step part 121a provided on the inner circumference of the motor support unit 121.

For that reason, with the motor shaft 20, the outer circumference of the position separated to the one end 20a side seen from the rotor core 21 is supported to be able to rotate with the cylindrical motor support unit 121 with the bearing B1 interposed.

As shown in FIG. 1, with the motor shaft 20, the bearing B1 is externally fitted and fixed to the outer circumference of the supported part 202 of the other end 20b side.

The other end 20b side of the motor shaft 20 is supported to be able to rotate by a cylindrical motor support unit 111 of the outer cover 11 with the bearing B1 interposed.

With the motor housing 10 that surrounds the outer circumference of the rotor core 21 with a prescribed gap, seal rings SL, SL are provided on one end 10a and another end 10b in the rotation axis X direction. The one end 10a of the motor housing 10 is joined without a gap to a ring shaped junction part 120 of the inner cover 12 by the seal ring SL provided at the one end 10a.

The other end 10b of the motor housing 10 is joined without a gap to a ring shaped junction part 110 of the outer cover 11 by the seal ring SL provided at the other end 10b.

In this state, at the inner diameter side of a coil end 253a noted later, the motor support unit 121 at the inner cover 12 side is arranged facing a one end part 21a of the rotor core 21 with a gap open in the rotation axis X direction.

At the inner diameter side of a coil end 253b noted later, the motor support unit 111 of the outer cover 11 side is arranged facing another end part 21b of the rotor core 21 with a gap opened in the rotation axis X direction.

Inside the motor housing 10, the rotor core 21 is arranged between the motor support unit 111 of the outer cover 11 side, and the motor support unit 121 of the inner cover 12 side.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 204 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound around a plurality of teeth parts 252 is adopted, and the stator core 25 has a longer length in the rotation axis X direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

As shown in FIG. 2, with the one end 20a of the motor shaft 20, the motor support unit 121 of the inner cover 12 is positioned inside the space Sc penetrating the transmission mechanism 3 side (right side in the drawing).

A lip seal RS is arranged on the inner circumference of the motor support unit 121.

The lip seal RS seals the gap between the inner circumference of the motor support unit 121 and the outer circumference of the motor shaft 20.

The lip seal RS partitions the space Sa of the inner diameter side of the motor housing 10, and the space Sc of the inner diameter side of the inner case 14, and is provided to block entry of oil OL to inside the space Sa from the space Sc side.

Figure 3:
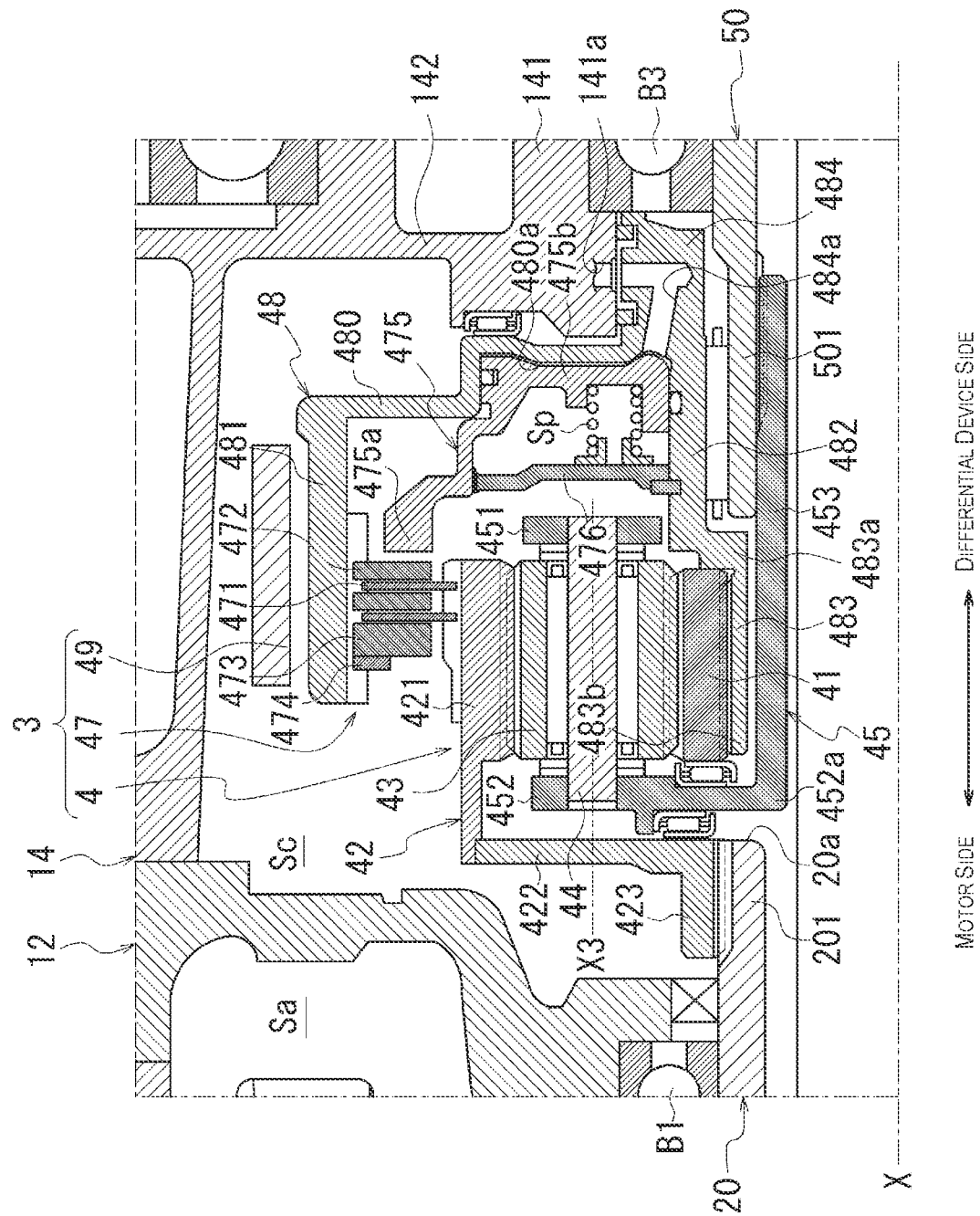
FIG. 3 is a drawing for explaining a transmission mechanism of the power transmission device.

FIG. 3 is a drawing for explaining the transmission mechanism 3.

The transmission mechanism 3 is arranged inside the space Sc.

The transmission mechanism 3 has a planetary gear set 4, a clutch 47, and a band brake 49.

The planetary gear set 4 has a sun gear 41, a ring gear 42, a pinion gear 43, a pinion shaft 44, and a carrier 45.

The constitutional elements of the planetary gear set 4 (sun gear 41, ring gear 42, pinion gear 43, pinion shaft 44, carrier 45) are provided on the inner diameter side of an outer wall part 481 of a clutch drum 48.

The clutch 47 has: a drive plate 471 (inner diameter side friction plate) spline fitted to the outer circumference of the ring gear 42; a driven plate 472 (outer diameter side friction plate) spline fitted to the inner circumference of the outer wall part 481 of the clutch drum 48; and a piston 475 provided to be able to move in the rotation axis direction.

The clutch drum 48 has the outer wall part 481, a disk part 480, an inner wall part 482, and a linking part 483.

The outer wall part 481 has a cylindrical shape that surrounds the rotation axis X with a prescribed gap. The disk part 480 extends to the inner diameter side from the end part of the differential device 6 side (right side in the drawing) of the outer wall part 481. The area of the inner diameter side of the disk part 480 is a recess 480a recessed in the direction away from the planetary gear set 4.

The inner wall part 482 is formed in a cylinder shape that surrounds the rotation axis X with a prescribed gap. The inner wall part 482 extends to the planetary gear set 4 side (left side in the drawing) from the end part of the inner diameter side of the disk part 480, and the tip of the inner wall part 482 faces the meshing portion of the sun gear 41 and the pinion gear 43 with a gap open in the rotation axis X direction.

The linking part 483 has a cylindrical shape that surrounds the rotation axis X with a prescribed gap. With the linking part 483, a base end part 483a in the longitudinal direction is linked to the inner circumference of the tip side of the inner wall part 482.

The linking part 483 extends in a straight line in the direction approaching the motor 2 (leftward in the drawing) on the extension of the linking part 201 of the motor shaft 20 noted above. A tip 483b of the linking part 483 is positioned further to the motor 2 side than the outer wall part 481.

The clutch drum 48 consisting of the outer wall part 481, the disk part 480, the inner wall part 482, and the linking part 483 has an opening provided facing the motor 2 side, and the sun gear 41 of the planetary gear set 4 is spline fitted to the outer circumference of the linking part 483 positioned on the inner diameter side.

With the planetary gear set 4, the ring gear 42 is positioned at the outer diameter side of the sun gear 41. The ring gear 42 has: a peripheral wall part 421 that surrounds the outer circumference of the sun gear 41 with a prescribed gap; a disk part 422 that extends to the inner diameter side from the end part of the motor 2 side of the peripheral wall part 421; and a linking part 423 that extends to the motor 2 side from the end part of the inner diameter side of the disk part 422.

The linking part 423 has a ring shape that surrounds the rotation axis X with a prescribed gap, and the linking part 201 of the one end 20a side of the motor shaft 20 is spline fitted to the inner circumference of the linking part 423.

With the peripheral wall part 421 positioned further to the outer diameter side than the linking part 423, the outer circumference of the pinion gear 43 engages with the inner circumference of the area positioned at the outer diameter side of the sun gear 41.

The pinion gear 43 engages with the inner circumference of the peripheral wall part 421 of the ring gear 42 side, and the outer circumference of the sun gear 41.

The pinion shaft 44 that supports the pinion gear 43 is provided facing along axis line X3 that is parallel to the rotation axis X. One end and the other end of the pinion shaft 44 are supported by a pair of side plates 451, 452 that constitute the carrier 45.

The side plates 451, 452 are provided in parallel to each other with a gap open in the axis line X3 direction.

One side plate 452 positioned at the motor 2 side extends more to the rotation axis X side than the other side plate 451. A cylindrical linking part 453 that surrounds the rotation axis X with a prescribed gap is integrally formed with an end part 452a of the inner diameter side of the side plate 452.

The linking part 453 extends on the rotation axis X side (inner diameter side) of the linking part 201 of the motor shaft 20 in the direction away from the motor 2 along the rotation axis X.

The linking part 453 is provided crossing the inner diameter side of the sun gear 41 from the motor 2 side to the differential device 6 side, and the linking part 453 is spline fitted to the inner circumference of a linking part 501 of a hollow shaft 50 at the inner diameter side of the inner wall part 482 of the clutch drum 48.

The driven plate 472 of the clutch 47 is spline fitted to the inner circumference of the outer wall part 481 of the clutch drum 48. The drive plate 471 of the clutch 47 is spline fitted to the outer circumference of the peripheral wall part 421 of the ring gear 42.

The drive plate 471 and the driven plate 472 are provided alternately between the peripheral wall part 421 of the ring gear 42 and the outer wall part 481 of the clutch drum 48.

A retaining plate 473 positioned by a snap ring 474 is positioned at the motor 2 side of an area in which the drive plate 471 and the driven plate 472 are alternately provided, and a pressing unit 475a of the piston 475 is positioned at the differential device 6 side.

A base 475b of the inner diameter side of the piston 475 is provided at a position farther from the planetary gear set 4 than the pressing unit 475a on the outer diameter side. The base 475b of the inner diameter side of the piston 475 is internally fitted in the recess 480a of the inner diameter side of the disk part 480 adjacent in the rotation axis X direction.

A spring Sp supported by a spring retainer 476 is pressure welded from the rotation axis X direction on the surface of the motor 2 side (left side in the drawing) of the base 475b.

The piston 475 is energized to the differential device 6 side by the energizing force acting from the spring Sp.

With the clutch drum 48, at the boundary of the recess 480a and the inner wall part 482, a projection 484 that projects to the differential device 6 side is provided. The projection 484 is inserted in the inner circumference of a first support unit 141 of a bearing B3. A supply channel 141a of the oil OL is opened in the inner circumference of the first support unit 141.

In the interior of the projection 484, provided is an oil passage 484a for guiding the oil OL supplied from the first support unit 141 side to inside the recess 480a of the clutch drum 48.

The oil OL supplied via the oil passage 484a is supplied to an oil chamber between the base 475b of the piston 475 and the recess 480a, and displaces the piston 475 to the motor 2 side.

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by an actuator (not illustrated), the rotation of the clutch drum 48 around the rotation axis X is regulated.

With the transmission mechanism 3, the planetary gear set 4 and the clutch 47 are positioned at the inner diameter side of the band brake 49. The band brake 49, the planetary gear set 4, and the clutch 47 overlap in the radial direction of the rotation axis X, and when viewed from radially outward of the rotation axis X, the band brake 49, the planetary gear set 4, and the clutch 47 are provided in an overlapping positional relationship.

With the transmission mechanism 3 of the present embodiment, the ring gear 42 of the planetary gear set 4 serves as the input unit of the outputted rotation of the motor 2, and the carrier 45 as the output unit of the inputted rotation.

With the transmission mechanism 3, the specification is that switching between the low gear speed and the high gear speed is performed by changing the combination of the engagement/release of the clutch 47, and the operation of the band brake 49.

The transmission mechanism 3 is able to switch between the low gear speed and the high gear speed.

With the transmission mechanism 3, low gear speed is realized with the following condition (a), and high gear speed is realized with condition (b).

(a) Band brake 49: Operated, Clutch 47: Released
(b) Band brake 49: Not operated, Clutch 47: Engaged Here, the transmission mechanism 3 is a two-speed transmission mechanism, where low gear speed and high gear speed are in the same rotational direction (forward position and reverse position). Switching of forward and reverse is possible by forward/reverse rotation of the motor 2.

After being shifted by the transmission mechanism 3, the output rotation of the motor 2 is outputted to the hollow shaft 50 to which the linking part 453 of the carrier 45 is linked.

As shown in FIG. 2, with the hollow shaft 50 to which rotation shifted by the transmission mechanism 3 is inputted, one end 50a in the longitudinal direction is provided with a gap open in the rotation axis X direction on a bearing B5 that supports a support unit 601 of the differential case 60. An other end 50b of the hollow shaft 50 serves as the linking part 501 with the planetary gear set 4.

The outer circumference of the linking part 501 is supported by the needle bearing NB interposed between itself and the inner wall part 482 of the clutch drum 48.

A gear part 502 is formed integrally at the outer circumference of the one end 50a side of the hollow shaft 50. Bearings B3, B3 are externally fitted on both sides of the gear part 502.

The bearing B3 of the one end 50a side is supported by a support unit 151 of the inner case 14 side, and the bearing B3 of the other end 50b side is supported by the first support unit 141 of the inner case 14.

A large diameter gear 52 of the counter gear 5 is engaged capable of rotation transmission to the outer circumference of the gear part 502. In the counter gear 5, the large diameter gear 52 is spline fitted to the outer circumference of a cylindrical hollow shaft part 51.

At a one end part 51a and another end part 51b in the longitudinal direction of the hollow shaft part 51, a bearing B4 is externally fitted. The bearing B4 externally fitted to the one end part 51a of the hollow shaft part 51 is inserted in a cylindrical second support unit 135 of the outer case 13. The one end part 51a of the hollow shaft part 51 is supported to be able to rotate by the second support unit 135 of the outer case 13 via the bearing B4.

The bearing B4 that is externally fitted in the other end part 51b of the hollow shaft part 51 is inserted in a cylindrical second support unit 145 of the inner case 14. The other end part 51b of the hollow shaft part 51 is supported to be able to rotate on the second support unit 145 of the inner case 14 via the bearing B4.

In this state, the hollow shaft part 51 of the counter gear 5 is provided along a rotation axis X1 parallel to the rotation axis X.

With the hollow shaft part 51, a parking gear 53 is provided adjacent to the one end part 51a side (left side in the drawing) when viewed from the large diameter gear 52.

With the hollow shaft part 51, a small diameter gear part 511 is provided at a position separated from the one end part 51a side (right side in the drawing) when viewed from the parking gear 53. The small diameter gear part 511 is integrally formed with the hollow shaft part 51, and is formed with an outer diameter R2 that is smaller than outer diameter R1 of the large diameter gear 52 (see FIG. 4: R1>R2).

The small diameter gear part 511 is engaged to be able to do rotation transmission with a final gear FG fixed to the differential case 60 of the differential device 6.

Figure 4:
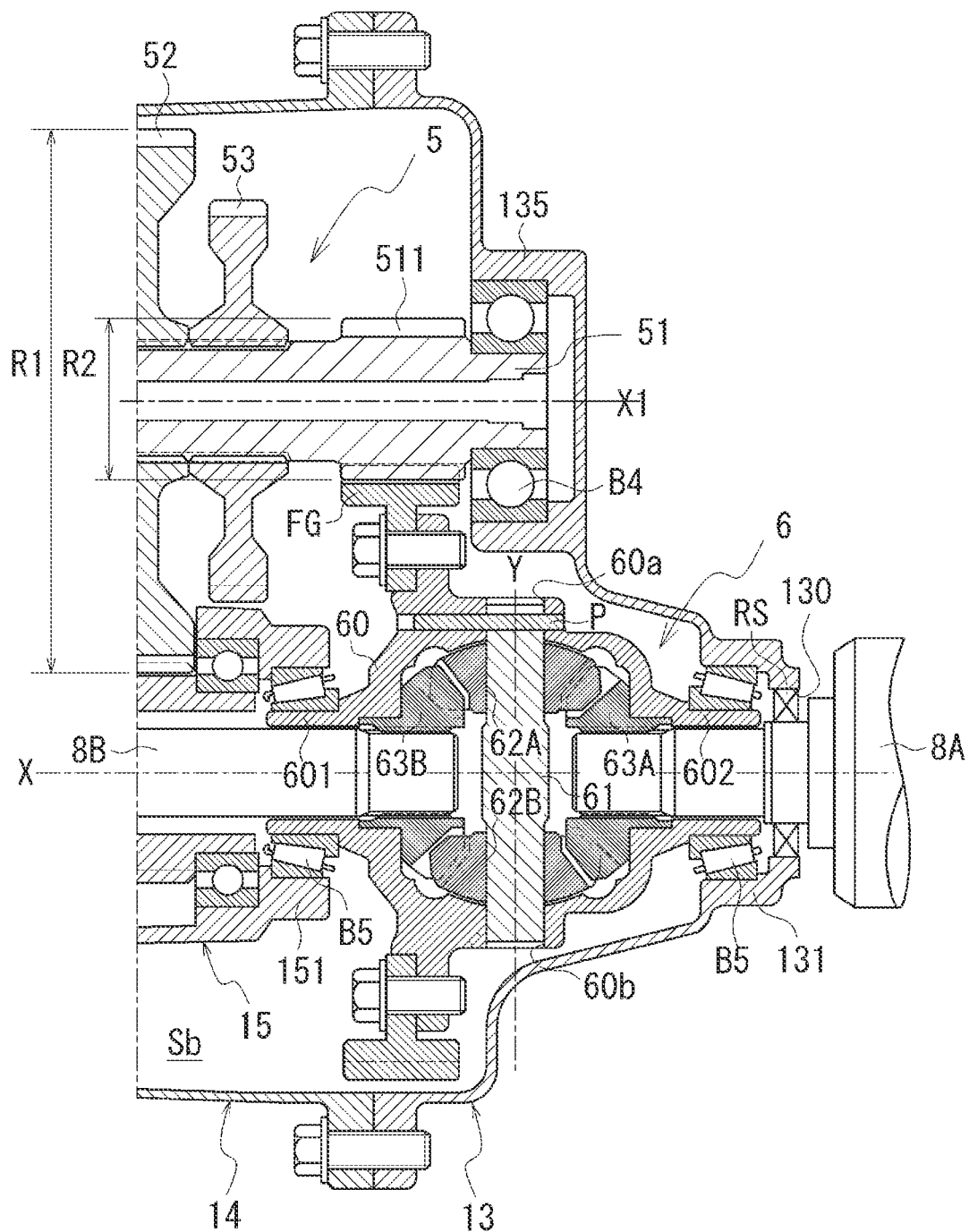
FIG. 4 is an enlarged view around a differential device of the power transmission device.

FIG. 4 is an enlarged view around the differential device 6 of the power transmission device 1.

With the power transmission device 1, the output rotation of the motor 2 is inputted to the hollow shaft 50 via the transmission mechanism 3. The rotation inputted to the hollow shaft 50 is inputted to the counter gear 5 via the large diameter gear 52 engaged with the gear part 502.

With the counter gear 5, the large diameter gear 52 and the parking gear 53 are spline fitted to the outer circumference of the hollow shaft part 51, and the small diameter gear part 511 is integrally formed with the hollow shaft part 51.

For that reason, when the output rotation of the motor 2 is inputted to the counter gear 5, the parking gear 53 and the small diameter gear part 511 rotate around the axis line X1 together with the large diameter gear 52.

Having done that, the final gear FG with which the small diameter gear part 511 engages to be able to transmit rotation is fixed to the differential case 60, so the differential case 60 rotates around the rotation axis X in conjunction with the rotation of the counter gear 5 around the axis line X1.

Here, with the counter gear 5, the outer diameter R2 of the small diameter gear part 511 is smaller than the outer diameter R1 of the large diameter gear part 52 (see FIG. 4).

Also, with the counter gear 5, the large diameter gear 52 serves as the input unit of the rotation transmitted from the motor 2 side, and the small diameter gear part 511 serves as the output unit of the transmitted rotation.

Having done that, the rotation inputted to the counter gear 5, after being significantly reduced, is outputted to the differential case 60.

As shown in FIG. 4, the differential case 60 is formed to have a hollow shape that internally houses the shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

A bearing B5 is externally fitted on the support unit 602 of the differential case 60. The bearing B5 that is externally fitted on the support unit 602 is held by a ring shaped first support unit 131 of the outer case 13.

The drive shaft 8A that penetrates an opening 130 of the outer case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The bearing B5 is externally fitted on the support unit 601 of the differential case 60.

The support unit 601 of the differential case 60 is supported to be able to rotate on the support unit 151 of a support member 15 fixed to the inner case 14.

The bearing B5 that is externally fitted on the support unit 601 is held by the ring shaped support unit 151 of the support member 15.

As shown in FIG. 1, the support member 15 has a cylindrical part 152 extending to the motor 2 side (right side in the drawing) from the outer circumference of the support unit 151, and a flange part 153 that surrounds the opening of the tip side of the cylindrical part 152 across the entire circumference. The flange part 153 of the support member 15 is fixed to the first support unit 141 of the inner case 14 by a bolt B that penetrates the flange part 153.

The support unit 601 of the differential case 60 is supported to be able to rotate by the support member 15 via the bearing B5. With the present embodiment, the support member 15 is fixed to the inner case 14. For that reason, the support unit 601 of the differential case 60 is supported by the inner case 14 which is a fixed side member with the bearing B5 and the support member 15 interposed.

As shown in FIG. 1, the drive shaft 8B that penetrates an opening 114 of the cover 11 is inserted in the support unit 601 of the differential case 60 from the rotation axis X direction.

The drive shaft 8B is provided crossing the motor shaft 20 of the motor 2, the planetary gear set 4, and the inner diameter side of the hollow shaft 50 in the rotation axis X direction, and the tip side of the drive shaft 8B is supported to be able to rotate by the support unit 601.

The lip seal RS is fixed to the inner circumference of the opening 114 of the outer cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

As shown in FIG. 4, in the interior of the differential case 60, the side gears 63A, 63B are spline fitted at the outer circumference of the tip part of the drive shafts 8 (8A, 8B), and the side gears 63A, 63B and the drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and the shaft 61 is inserted in the shaft holes 60a, 60b.

The shaft 61 is fixed to the differential case 60 by a pin P, and the shaft 61 is prohibited from auto-rotating around the axis line Y.

The shaft 61 is positioned between the side gears 63A, 63B inside the differential case 60, and arranged along the axis line Y.

The bevel gears 62A, 62B are externally fitted on the shaft 61 inside the differential case 60 and supported to be able to rotate.

Two bevel gears 62A, 62B are provided with a gap opened in the longitudinal direction of the shaft 61 (axial direction of the axis line Y), and the bevel gears 62A, 62B are arranged in a state so that their teeth face each other.

In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the axial direction of the rotation axis X.

Two side gears 63A, 63B are provided with a gap open in the axial direction of the rotation axis X in a state so that their teeth face each other, and the bevel gears 62A, 62B and the side gears 63A, 63B are assembled in a state with the teeth mutually engaged.

The action of the power transmission device 1 of this configuration is explained.

As shown in FIG. 1, with the power transmission device 1, the transmission mechanism 3, the counter gear 5, the differential device 6, and the drive shafts 8 (8A, 8B) are provided along the transmission route of the output rotation of the motor 2.

As shown in FIG. 2, when the rotor core 21 rotates around the rotation axis X by the driving of the motor 2, the rotation is inputted to the transmission mechanism 3 via the motor shaft 20 that rotates integrally with the rotor core 21.

With the transmission mechanism 3, the ring gear 42 of the planetary gear set 4 serves as the input unit, and the carrier 45 as the output unit of the inputted rotation.

With the transmission mechanism 3, the state of the rotation of the clutch drum 48 being regulated by the operation of the band brake 49 is set to have a higher gear change ratio than the state of the ring gear 42 and the clutch drum 48 rotating integrally.

Specifically, with the transmission mechanism 3, the low gear speed is realized in the state with the band brake 49 operating, and the high gear speed in the state with the clutch 47 operating.

For that reason, the rotation inputted to the transmission mechanism 3 is outputted to the hollow shaft 50 from the linking part 453 of the carrier 45 after the gear shift. Then, the rotation inputted to the hollow shaft 50 is inputted to the counter gear 5 via the large diameter gear 52 that is engaged with the gear part 502 of the hollow shaft 50.

With the counter gear 5, the large diameter gear 52 that engages with the gear part 502 of the hollow shaft 50 serves as the input unit of the output rotation of the motor 2, and the small diameter gear part 511 that engages with the final gear FG of the differential case 60 serves as the output unit of the inputted rotation.

Here, with the counter gear 5, the outer diameter R2 of the small diameter gear part 511 is smaller than the outer diameter R1 of the large diameter gear part 52 (see FIG. 4).

For that reason, the rotation inputted to the counter gear 5 is significantly reduced, after which it is outputted to the differential case 60 (differential device 6) via the final gear FG with which the small diameter gear part 511 engages.

By the differential case 60 rotating around the rotation axis X by the inputted rotation, the drive shafts 8 (8A, 8B) rotate around the rotation axis X. As a result, the output rotation of the motor 2 is transmitted to the left and right drive wheels (not illustrated) of the vehicle in which the power transmission device 1 is mounted.

Here, with the power transmission device 1, the transmission mechanism 3 comprising the planetary gear set 4, the clutch 47, and the band brake 49 is adopted, and the output rotation of the motor 2 undergoes gear change by the transmission mechanism 3 and is transmitted to the counter gear 5.

Here, in the case of a meshing type engagement device, switching of the gear shift position is performed using the transmission switching member. For that reason, if the spline phase of the gear shift position before changing and the spline phase of the gear shift position after changing do not match, it is not possible to perform switching of the gear shift position. This is because the transmission switching member cannot engage with the spline of the change destination gear shift position.

In comparison with this, with the transmission mechanism 3 of the present embodiment, the specification is that switching between the low gear speed and the high gear speed is performed by changing the combination of the clutch 47 engagement/release, and the operation of the band brake 49. For that reason, as with the meshing type engagement device, a circumstance does not occur by which switching of the gear shift position cannot be performed.

Furthermore, with the transmission mechanism 3, the band brake 49 overlaps the clutch 47 and the planetary gear set 4 in the radial direction of the rotation axis X, and when seen from the radial direction of the rotation axis X, the band brake 49 is provided in a positional relationship overlapping the clutch 47 and the planetary gear set 4. For that reason, with the power transmission device 1, it is possible to shorten the length of the transmission mechanism 3 part in the rotation axis X direction.

Also, with the power transmission device 1, the motor shaft 20 of the rotor core 21, the counter gear 5, and the drive shafts 8 (8A, 8B) are arranged in series on the transmission route of the output rotation of the motor 2.

Also, the drive shaft 8B is provided penetrating the inner diameter side of the motor shaft 20 in the rotation axis X direction, and the drive shaft 8B and the motor shaft 20 are provided to be able to rotate relatively on a common rotation axis X.

For that reason, compared to the power transmission device in which the motor shaft, the counter gear, and the drive shaft are provided on different rotation axes that are parallel to each other, specifically, a so-called three-axis type power transmission device, it is possible to keep down the size of the radial direction of the rotation axis.

As described above, the power transmission device 1 of the present embodiment has the following configuration.

(1) The power transmission device 1 has the transmission mechanism 3 that has the planetary gear set 4, a first engagement element, and a second engagement element.

The first engagement element is the band brake 49 that is engaged when the transmission mechanism is at low gear speed.

The second engagement element is the clutch 47 (multi-plate friction clutch) that is engaged when the transmission mechanism is at high gear speed.

Both of the two engagement elements (first engagement element, second engagement element) are friction type engagement elements, so the gear shift position can be changed freely.

With the stepped transmission mechanism of Japanese Laid-Open Patent Publication No. 2018-118616, the specification is that the transmission switching member does spline engagement with one of the element that realizes low gear speed and the element that realize high gear speed to realize low gear speed or high gear speed.

For that reason, when the spline phase of the element that realizes high gear speed and the spline phase of the element that realizes low gear speed are skewed, it is not possible to switch the engagement destination of the transmission switching member, so it is necessary to match the spline phases.

In comparison to this, with the invention of the present case, friction type engagement elements are adopted, so it is not necessary to match the spline phases. For that reason, problems do not occur with switching of the gear shift position between high gear speed and low gear speed when a vehicle in which the power transmission device is mounted is stopped.

Here, the band brake 49 has little drag torque compared to the clutch 47. For that reason, when the transmission mechanism 3 engages the band brake 49 when in low gear speed, and engages with the clutch 47 when in high gear speed, there can be less drag torque that occurs when in high gear speed. This makes it possible to expect improved electricity consumption by the vehicle in which the power transmission device 1 is mounted.

Also, compared to the band brake 49, with the clutch 47, it is easier to control the transmission torque capacity, so during travel of the vehicle in which the power transmission device 1 is mounted, it is possible to reduce shift shock that occurs during switching from low gear speed to high gear speed.

In this way, by having the two engagement elements comprised by the transmission mechanism 3 be different friction type engagement elements, it is possible to reduce shift shock during travel, and to reduce friction during travel in high gear speed.

The power transmission device 1 of the present embodiment has the following configuration.

(2) The band brake 49 overlaps with the planetary gear set 4 in the radial direction of the rotation axis X.

Viewed from the radial direction of the rotation axis X, the band brake 49 and the planetary gear set 4 are arranged to overlap.

By configuring in this way, it is possible to shorten the power transmission device 1 in the rotation axis direction.

The power transmission device 1 of the present embodiment has the following configuration.

(3) The band brake 49 overlaps with the driven plate 472 and the drive plate 471 of the clutch 47 (multi-plate friction clutch) in the radial direction of the rotation axis X.

Viewed from the radial direction of the rotation axis X, the band brake 49, the driven plate 472 and the drive plate 471 are arranged to overlap.

By configuring in this way, it is possible to shorten the power transmission device 1 in the rotation axis direction.

The power transmission device 1 of the present embodiment has the following configuration.

(4) The band brake 49 overlaps with the piston 475 of the clutch 47 in the radial direction of the rotation axis X.

Viewed from the radial direction of the rotation axis X, the band brake 49 and the piston 475 are arranged to overlap.

By configuring in this way, it is possible to shorten the power transmission device 1 in the rotation axis direction.

The power transmission device 1 of the present embodiment has the following configuration.

(5) The driven plate 472, the drive plate 471, and the piston 475 of the clutch 47 (multi-plate friction clutch)

overlap with the band brake 49 and the planetary gear set 4 in the radial direction of the rotation axis X.

Viewed from the radial direction of the rotation axis X, the constituent elements of the clutch 47 (driven plate 472, drive plate 471, and piston plate 475) are arranged to overlap the band brake 49 and the planetary gear set 4.

By configuring in this way, it is possible to shorten the power transmission device 1 in the rotation axis direction.

The power transmission device 1 of the present embodiment has the following configuration.

(6) The power transmission device 1 has the motor 2.

The transmission mechanism 3 is connected downstream of the motor 2.

Since there is a tendency for the output torque to decrease as the motor 2 goes to higher rotation speed, this configuration that can reduce friction when in high gear speed is particularly suitable for power transmission devices using a motor as the drive source.

Second Embodiment

Next, a second embodiment of the present embodiment is explained.

In the explanation hereafter, parts in common with the first embodiment noted above are marked by the same code numbers, and an explanation is omitted to the extent possible.

Figure 5:
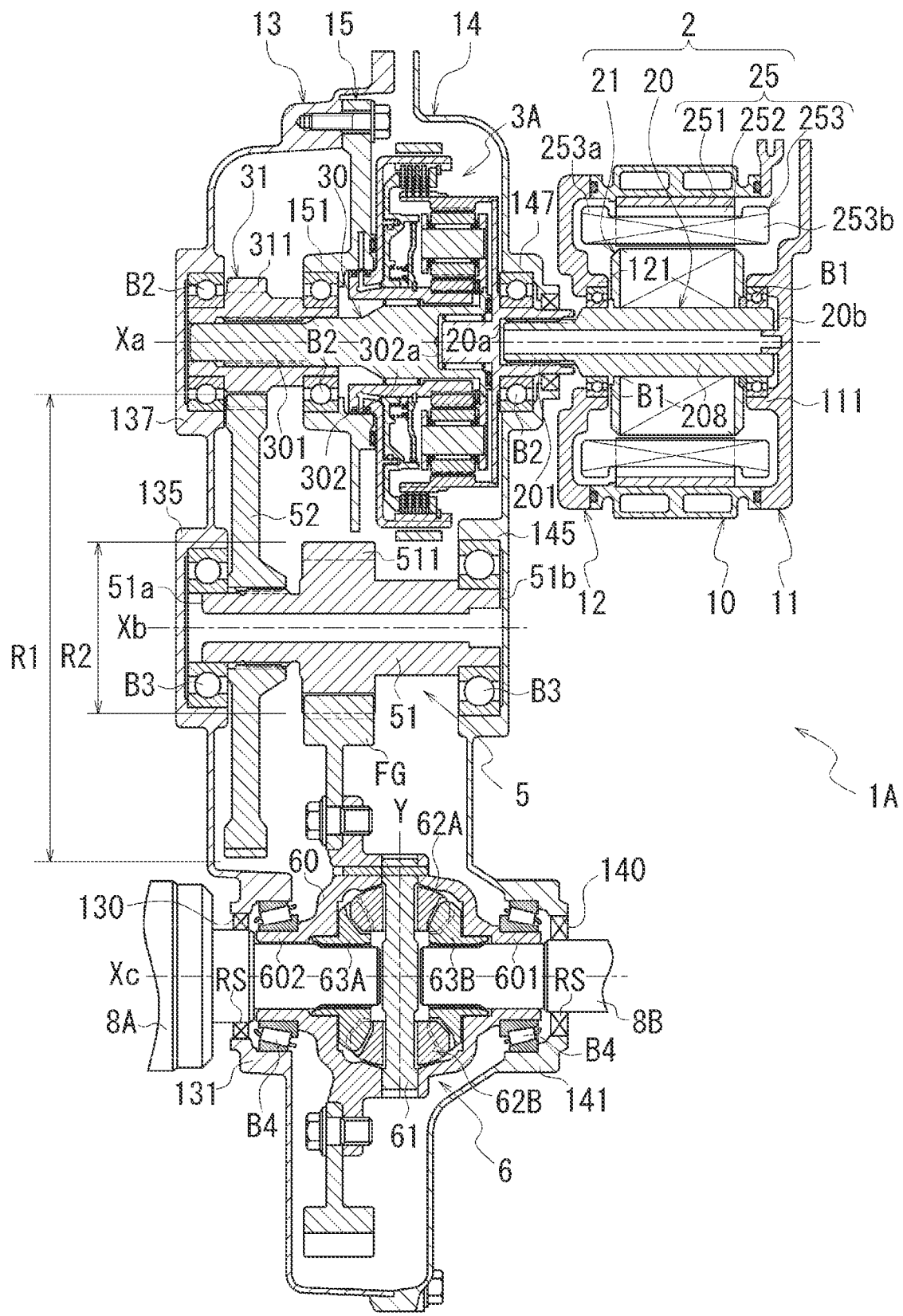
FIG. 5 is a drawing for explaining the power transmission device of a second embodiment.

FIG. 5 is a drawing for explaining a power transmission device 1A of the second embodiment.

Figure 6:
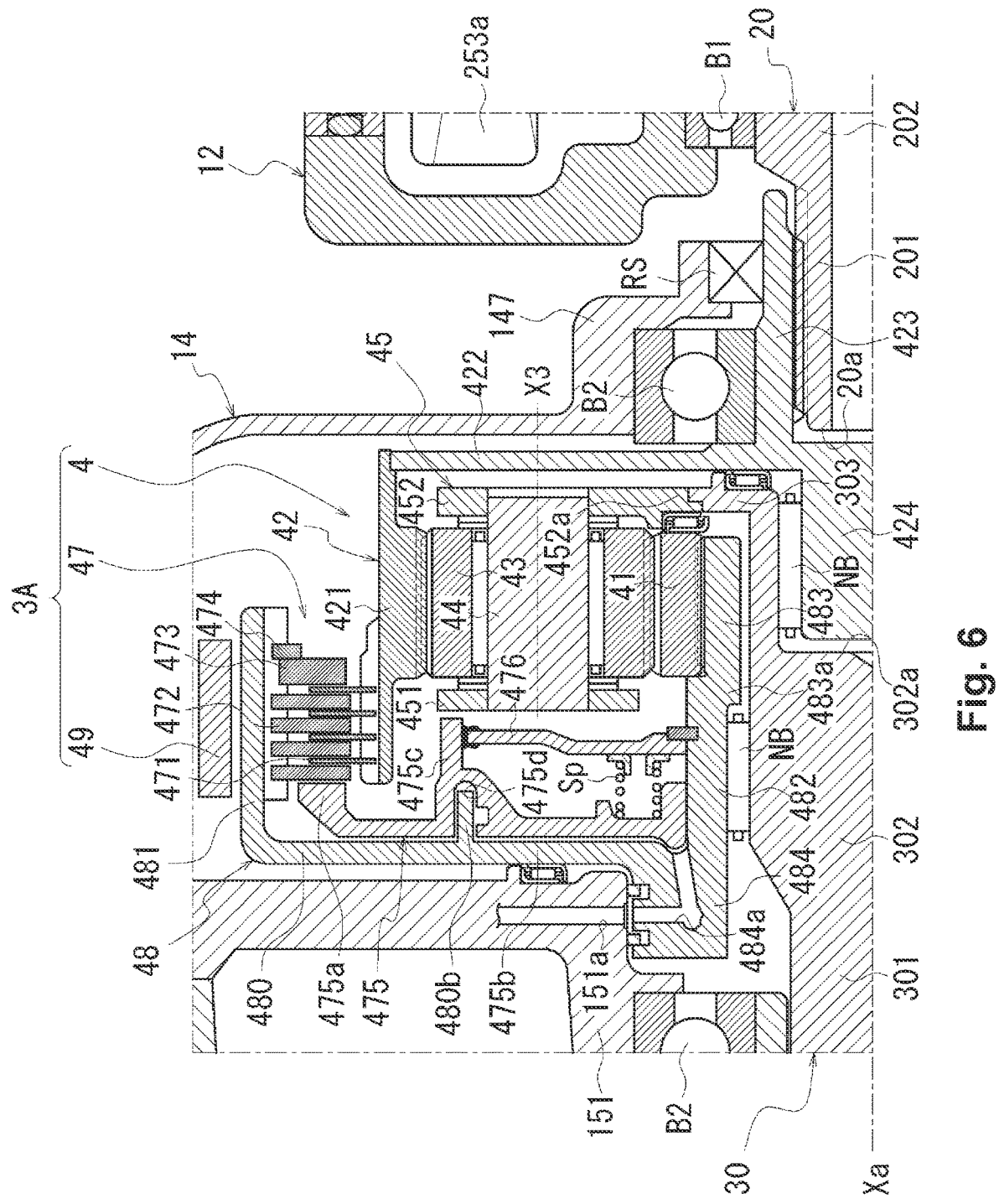
FIG. 6 is a drawing for explaining the transmission mechanism of the power transmission device of the second embodiment.

FIG. 6 is an enlarged view around a transmission mechanism 3A of the power transmission device 1A.

As shown in FIG. 5, the power transmission device 1A has the motor 2, the transmission mechanism 3A, the counter gear 5 that transmits the output rotation of the transmission mechanism 3A to the differential device 6, and the differential device 6 that transmits the transmitted rotation to drive shafts 8 (8A, 8B).

With the power transmission device 1A, the transmission mechanism 3A, the counter gear 5, the differential device 6, and the drive shafts 8 (8A, 8B) are provided along the transmission route of the output rotation of the motor 2.

After being shifted by the transmission mechanism 3A, the output rotation of the motor 2 is reduced by the counter gear 5, and transmitted to the differential device 6. With the differential device 6, the transmitted rotation is transmitted via the drive shafts 8 (8A, 8B) to drive wheels (not illustrated) at left and right of a vehicle in which the power transmission device 1 is mounted.

Here, the transmission mechanism 3A is connected downstream of the motor 2, the counter gear 5 is connected downstream of the transmission mechanism 3A, the differential device 6 is connected downstream of the counter gear 5, and the drive shafts 8 (8A, 8B) are connected downstream of the differential device 6.

With the power transmission device 1A, the motor 2 and the transmission mechanism 3A are arranged coaxially on a common rotation axis Xa. A rotation axis Xb of the counter gear 5, and a rotation axis Xc of the differential device 6 and the drive shafts 8 (8A, 8B) are provided in parallel to the rotation axis Xa at the radially outward side of the rotation axis Xa.

The power transmission device 1A is a so-called three-axis power transmission device in which rotation axes Xa, Xb, and Xc which are involved in transmitting rotation are arranged to be parallel to each other.

In the power transmission device 1A of the second embodiment as well, the body case 9 of the power transmission device 1A is constituted by the motor housing 10, the outer cover 11, the inner cover 12, the outer case 13, and the inner case 14.

The case (first case member) of the motor 2 is constituted by the motor housing 10, the outer cover 11, and the inner cover 12.

The case (second case member) that houses the transmission mechanism 3A, the counter gear 5, and the differential device 6 is constituted by the outer case 13 and the inner case 14.

As shown in FIG. 5, the motor 2 has: a cylindrical motor shaft 20; a cylindrical rotor core 21 externally fitted on the motor shaft 20; and a stator core 25 that surrounds the outer circumference of the rotor core 21 with a prescribed gap.

With the motor shaft 20, bearings B1, B1 are externally fitted on both sides of the rotor core 21. The motor shaft 20 is supported to be able to rotate on the motor support unit 111 of the outer cover 11, and the motor support unit 121 of the inner cover 12 via the bearings B1, B1.

As shown in FIG. 6, the linking part 201 for which the outer diameter is smaller than the large diameter part 208 of the other end 20b side is provided at the one end 20a side of the motor shaft 20.

The linking part 201 of the motor shaft 20 is spline fitted to the inner circumference of the linking part 423 of the transmission mechanism 3A side inside a ring shaped third support unit 147 of the inner case 14.

The transmission mechanism 3A has a planetary gear set 4, a clutch 47, and a band brake 49.

The planetary gear set 4 has a sun gear 41, a ring gear 42, a pinion gear 43, a pinion shaft 44, and a carrier 45.

The constitutional elements of the planetary gear set 4 (sun gear 41, ring gear 42, pinion gear 43, pinion shaft 44, carrier 45) are provided on the inner diameter side of the outer wall part 481 of the clutch drum 48.

The clutch 47 has: the drive plate 471 (inner diameter side friction plate) spline fitted to the outer circumference of the ring gear 42; the driven plate 472 (outer diameter side friction plate) spline fitted to the inner circumference of the outer wall part 481 of the clutch drum 48; and the piston 475 provided to be able to move in the rotation axis Xa direction.

The clutch drum 48 has the outer wall part 481, the disk part 480, the inner wall part 482, and the linking part 483.

The outer wall part 481 has a cylindrical shape that surrounds the rotation axis Xa with a prescribed gap. The disk part 480 extends to the inner diameter side from the end part of the outer wall part 481 on the side opposite to the motor 2 (left side in the drawing). The inner wall part 482 is provided at the end part of the inner diameter side of the disk part 480.

The inner wall part 482 is formed in a cylinder shape that surrounds the rotation axis Xa with a prescribed gap. The inner wall part 482 extends to the motor 2 side (right side in the drawing) from the end part of the inner diameter side of the disk part 480, and the tip of the inner wall part 482 is positioned at the inner diameter side of the band brake 49.

The linking part 483 has a cylindrical shape that surrounds the rotation axis Xa with a prescribed gap. With the linking part 483, the base end part 483a in the longitudinal direction is linked to the inner circumference of the tip side of the inner wall part 482.

The linking part 483 extends in a straight line in the direction approaching the motor 2 (rightward in the drawing).

The clutch drum 48 consisting of the outer wall part 481, the disk part 480, the inner wall part 482, and the linking part 483 has an opening provided facing the motor 2 side.

The inner circumference of the inner wall part 482 is supported by the outer circumference of a support shaft 30 with the needle bearing NB interposed.

As shown in FIG. 5, the support shaft 30 is a shaft-like member for which a small diameter part 301 and a large diameter part 302 are integrally formed aligned in the rotation axis Xa direction, and is arranged facing along the rotation axis Xa.

The support shaft 30 is arranged coaxially with the motor shaft 20. As shown in FIG. 6, with the large diameter part 302 positioned at the motor 2 side (right side in the drawing) in the support shaft 30, a containment hole 302a in which the motor shaft 20 can be received is opened at the part facing the motor shaft 20.

A shaft 424 provided at the tip of the motor shaft 20 is inserted in the containment hole 302a. The needle bearing NB externally fitted on the shaft 424 is in contact on the inner circumference of the containment hole 302a, and the support shaft 30 and the motor shaft 20 are engaged to be able to rotate relatively at the containment hole 302a part.

A disk shaped flange part 303 is integrally formed with the tip part of the motor 2 side of the large diameter part 302. The flange part 303 is provided facing orthogonally to the rotation axis Xa, and the outer circumference of the flange part 303 extends to the side of the linking part 483 of the clutch drum 48.

The sun gear 41 of the planetary gear set 4 is spline fitted to the outer circumference of the linking part 483.

With the planetary gear set 4, the ring gear 42 is positioned at the outer diameter side of the sun gear 41. The ring gear 42 has: the peripheral wall part 421 that surrounds the outer circumference of the sun gear 41 with a prescribed gap; the disk part 422 that extends to the inner diameter side from the end part of the motor 2 side of the peripheral wall part 421; the linking part 423 that extends to the motor 2 side from the end part of the inner diameter side of the disk part 422; and the shaft 424 that extends from the end part of the inner diameter side of the disk part 422 to the side opposite the motor 2.

With the peripheral wall part 421 positioned further to the outer diameter side than the shaft 424, the outer circumference of the pinion gear 43 engages with the inner circumference of the area positioned at the outer diameter side of the sun gear 41.

The pinion gear 43 engages with the inner circumference of the peripheral wall part 421 of the ring gear 42 side, and the outer circumference of the sun gear 41.

The pinion shaft 44 that supports the pinion gear 43 is provided facing along the axis line X3 that is parallel to the rotation axis Xa of the motor 2. One end and the other end of the pinion shaft 44 are supported by the pair of side plates 451, 452 that constitute the carrier 45.

The side plates 451, 452 are provided in parallel to each other with a gap open in the axis line X3 direction.

One side plate 452 positioned at the motor 2 side extends more to the rotation axis X side than the other side plate 451. The end part 452a of the inner diameter side of the side plate 452 is linked to the outer circumference of the flange part 303 of the support shaft 30 side.

The peripheral wall part 421 of the ring gear 42 has a ring shape that surrounds the rotation axis Xa with a prescribed gap, and the drive plate 471 of the clutch 47 is spline fitted to the outer circumference of the peripheral wall part 421. The driven plate 472 of the clutch 47 is spline fitted to the inner circumference of the outer wall part 481 of the clutch drum 48.

The drive plate 471 and the driven plate 472 are provided alternately between the peripheral wall part 421 of the ring gear 42 and the outer wall part 481 of the clutch drum 48.

The retaining plate 473 positioned by the snap ring 474 is positioned at the motor 2 side of an area in which the drive plate 471 and the driven plate 472 are alternately provided, and the pressing unit 475a of the piston 475 is positioned at the side opposite the motor 2.

The piston 475 has the base 475b provided facing orthogonally to the rotation axis Xa. At substantially the center of the base 475b in the radial direction of the rotation axis Xa, a cylindrical wall part 475c extending to the motor 2 side (right side in the drawing) is provided.

At the base 475b of the piston 475, in the area in which the cylindrical wall part 475c is provided, a slit 475d recessed in the direction away from the disk part 480 of the clutch drum 480 (rightward in the drawing) is provided.

A guide piece 480b extending to the motor 2 side from the disk part 480 of the clutch drum 48 is inserted in the slit 475d.

The spring Sp supported by the spring retainer 476 is pressure welded from the rotation axis X direction on the surface of the motor 2 side of the base 475b in the area more to the inner diameter side than the cylindrical wall part 475c in the base 475b.

The piston 475 is energized to the disk part 480 side (left side in the drawing) of the clutch drum 48 by the energizing force acting from the spring Sp.

With the clutch drum 48, at the boundary of the disk part 480 and the inner wall part 482, the projection 484 that projects to the side opposite the motor 2 is provided. The projection 484 is inserted in the inner circumference of the support unit 151 of the bearing B2. A supply channel 151a of oil OL is opened in the inner circumference of the support unit 151.

In the interior of the projection 484, provided is the oil passage 484a for guiding the oil OL supplied from the support unit 151 side to the oil chamber between the disk part 480 of the clutch drum 48 and the base 475b of the piston 475.

The oil OL supplied to the oil chamber via the oil passage 484a displaces the piston 475 to the motor 2 side (right side in the drawing). At this time, the displacement of the piston 475 in the rotation axis X direction is guided by the guide piece 480b provided in the disk part 480, and the slit 475d of the piston 475 side in which the guide piece 480b is inserted.

When the piston 475 is displaced to the motor 2 side, the drive plate 471 and the driven plate 472 of the clutch 47 are gripped between the pressing unit 475a of the piston 475 and the retaining plate 473.

By doing this, the relative rotation of the ring gear 42 to which the drive plate 471 is spline fitted, and the clutch drum 48 to which the driven plate 472 is spline fitted is regulated according to the pressure of the supplied oil OL, and finally the relative rotation is regulated.

Furthermore, the band brake 49 is wound around the outer circumference of the outer wall part 481 of the clutch drum 48. When the winding radius of the band brake 49 is narrowed by the actuator (not illustrated), the rotation of the clutch drum 48 around the rotation axis X is regulated.

With the transmission mechanism 3A, the planetary gear set 4, and the clutch 47 are positioned at the inner diameter side of the band brake 49. The band brake 49, the planetary gear set 4, and the clutch 47 overlap in the radial direction of the rotation axis X, and when viewed from radially outward of the rotation axis X, the band brake 49, the planetary gear set 4, and the clutch 47 are provided in an overlapping positional relationship.

With the transmission mechanism 3A of the present embodiment, the ring gear 42 of the planetary gear set 4 serves as the input unit of the outputted rotation of the motor 2, and the carrier 45 as the output unit of the inputted rotation.

With the transmission mechanism 3, low gear speed is realized with the following condition (a), and high gear speed is realized with condition (b).

(a) Band brake 49: Operated, Clutch 47: Released
(b) Band brake 49: Not operated, Clutch 47: Engaged Here, the transmission mechanism 3 is a two-speed transmission mechanism, where low gear speed and high gear speed are in the same rotational direction (forward position and reverse position). Switching of forward and reverse is possible by forward/reverse rotation of the motor 2.

Specifically, with the transmission mechanism 3A, when the rotation of the clutch drum 48 is regulated by operation of the band brake 49, the low gear speed is realized. When the clutch 47 is engaged, and the ring gear 42 and the clutch drum 48 are linked without being able to rotate relatively, high gear speed is realized.

The output rotation of the motor 2 is outputted to the support shaft 30 from the side plate 452 of the carrier 45 after being shifted by the transmission mechanism 3A.

As shown in FIG. 5, the support shaft 30 extends in the direction away from the motor 2 along the rotation axis Xa. With the support shaft 30, a hollow shaft 31 is spline fitted to the outer circumference of the small diameter part 301.

With the hollow shaft 31, bearings B2, B2 are externally fitted at both sides in the rotation axis Xa direction.

The hollow shaft 31 is supported by a third support unit 137 of the outer case 13 side, and the support unit 151 of the support member 15 side with the bearings B2, B2 interposed. For that reason, the support shaft 30 is supported by the third support unit 147 of the outer case 13 side, and the third support unit 147 of the inner case 14 with the hollow shaft 31 interposed.

With the hollow shaft 31, a gear part 311 is integrally formed with the outer circumference of the area between the bearings B2, B2.

The large diameter gear 52 of the counter gear 5 is engaged with the ability to transmit rotation to the outer circumference of the gear part 311. In the counter gear 5, the large diameter gear 52 is spline fitted to the outer circumference of the cylindrical hollow shaft part 51.

Bearings B3, B3 are externally fitted at the one end part 51a and the other end part 51b in the longitudinal direction of the hollow shaft part 51.

The one end part 51a of the hollow shaft part 51 is supported to be able to rotate with the second support unit 135 of the outer case 13 via the bearing B3.

The other end part 51b of the hollow shaft part 51 is supported to be able to rotate with the second support unit 145 of the inner case 14 via the bearing B3.

In this state, the hollow shaft part 51 of the counter gear 5 is provided along the rotation axis Xb parallel to the rotation axis Xa.

With the hollow shaft part 51, the small diameter gear part 511 is provided adjacent to the other end part 51b side (right side in the drawing) when viewed from the large diameter gear 52. The small diameter gear part 511 is formed integrally with the hollow shaft part 51, and is formed with the outer diameter R2 smaller than the outer diameter R1 of the large diameter gear 52 (see FIG. 5: R1>R2).

The small diameter gear part 511 is engaged with the ability to transmit rotation to the final gear FG fixed to the differential case 60 of the differential device 6.

With the differential case 60, cylindrical support units 601, 602 are provided at both sides in the rotation axis Xc direction (lateral direction in the drawing). The support units 601, 602 extend along the rotation axis Xc parallel to the rotation axis Xa.

Bearings B4, B4 are externally fitted on the support units 601, 602 of the differential case 60.

The support unit 602 is held by the ring shaped first support unit 131 of the outer case 13 with the bearing B4 interposed.

The support unit 602 is held by the ring shaped first support unit 141 of the inner case 14 with the bearing B4 interposed.

The drive shaft 8B that penetrates an opening 140 of the inner case 14 is inserted from the rotation axis Xc direction in the support unit 601 of the differential case 60.

The drive shaft 8A that penetrates the opening 130 of the outer case 13 is inserted from the rotation axis Xc direction in the support unit 602 of the differential case 60.

In the interior of the differential case 60, the side gears 63A, 63B are spline fitted at the outer circumference of the tip part of the drive shafts 8 (8A, 8B).

In the interior of the differential case 60, the column shaped shaft 61 is provided along axis line Y orthogonal to the rotation axis X, and the side gears 63A, 63B face the rotation axis Xc direction with the shaft 61 sandwiched between.

The bevel gears 62A, 62B are externally fitted on the shaft 61 and supported to be able to rotate.

Two bevel gears 62A, 62B are provided with a gap opened in the longitudinal direction of the shaft 61 (axial direction of the axis line Y), and the bevel gears 62A, 62B are arranged in a state so that their teeth face each other.

Inside the differential case 60, the side gears 63A, 63B are positioned at both sides of the bevel gears 62A, 62B in the rotation axis X direction, and the bevel gears 62A, 62B and the side gears 63A, 63B are assembled in a state with the teeth mutually engaged.

The action of the power transmission device 1A of this configuration is explained.

As shown in FIG. 5, with the power transmission device 1A, the transmission mechanism 3A, the counter gear 5, the differential device 6, and the drive shafts 8 (8A, 8B) are provided along the transmission route of the output rotation of the motor 2.

When the rotor core 21 rotates around the rotation axis Xa by the driving of the motor 2, the rotation is inputted to the transmission mechanism 3A via the motor shaft 20 that rotates integrally with the rotor core 21.

With the transmission mechanism 3A, the ring gear 42 of the planetary gear set 4 serves as the input unit, and the carrier 45 as the output unit of the inputted rotation.

With the transmission mechanism 3A, the low gear speed is realized in the state with the band brake 49 operating, and the high gear speed with the state with the clutch 47 operating.

For that reason, the rotation inputted to the transmission mechanism 3A is outputted to the hollow shaft 50 from the linking part 453 of the carrier 45 after shifting. Then, the rotation inputted to the hollow shaft 50 is inputted to the counter gear 5 via the large diameter gear 52 engaged with the gear part 311 of the hollow shaft 50.

With the counter gear 5, the outer diameter R2 of the small diameter gear part 511 is smaller than the outer diameter R1 of the large diameter gear part 52 (see FIG. 4).

For that reason, the rotation inputted to the counter gear 5 is significantly reduced, after which it is outputted to the differential case 60 (differential device 6) via the final gear FG with which the small diameter gear part 511 engages.

Also, by the differential case 60 rotating around the rotation axis Xc by the inputted rotation, the drive shafts 8 (8A, 8B) rotate around the rotation axis Xc. As a result, the output rotation of the motor 2 is transmitted to the left and right drive wheels (not illustrated) of the vehicle in which the power transmission device 1A is mounted.

With the power transmission device 1A, the transmission mechanism 3A comprising the planetary gear set 4, the clutch 47, and the band brake 49 is adopted, and the output rotation of the motor 2 is shifted by the transmission mechanism 3A and transmitted to the counter gear 5.

With the transmission mechanism 3A, the specification is that switching between the low gear speed and the high gear speed is performed by changing the combination of the clutch 47 engagement/release, and the operation of the band brake 49. For that reason, as with the meshing type engagement device, a circumstance does not occur by which switching of the gear shift position cannot be performed.

With the transmission mechanism 3A, the band brake 49 overlaps the clutch 47 and the planetary gear set 4 in the radial direction of the rotation axis X, and when viewed from the radial direction of the rotation axis X, the band brake 49 is provided in a positional relationship overlapping the clutch 47 and the planetary gear set 4. For that reason, with the power transmission device 1, it is possible to shorten the length of the transmission mechanism 3A part in the rotation axis X direction.

As described above, the power transmission device 1A of the present embodiment has the following configuration.

(7) The power transmission device 1A has the transmission mechanism 3A that has the planetary gear set 4, the first engagement element, and the second engagement element.

The first engagement element is the band brake 49 that is engaged when the transmission mechanism is at low gear speed.

The second engagement element is the clutch 47 (multi-plate friction clutch) that is engaged when the transmission mechanism is at high gear speed.

When configured in this way, with the transmission mechanism 3A, the specification is that switching between the low gear speed and the high gear speed is performed by changing the combination of the clutch 47 engagement/release, and the operation of the band brake 49. For that reason, as with the meshing type engagement device, a circumstance does not occur by which switching of the gear shift position cannot be performed.

Furthermore, by having the two engagement elements comprised by the transmission mechanism 3A be different friction type engagement elements, it is possible to reduce shift shock during travel, and to reduce friction during travel at high gear speed.

As described above, the power transmission device 1A of the present embodiment has the following configuration.

(8) The band brake 49 overlaps in the radial direction of the rotation axis Xa with the planetary gear set 4.

The band brake 49 overlaps with the driven plate 472 and the drive plate 471 of the clutch 47 (multi-plate friction clutch) in the radial direction of the rotation axis Xa.

The band brake 49 overlaps with the piston 475 of the clutch 47 in the radial direction of the rotation axis Xa.

The driven plate 472, the drive plate 471, and the piston 475 of the clutch 47 (multi-plate friction clutch) overlap with the band brake 49 and the planetary gear set 4 in the radial direction of the rotation axis Xa.

By configuring in this way, it is possible to shorten the power transmission device 1A in the rotation axis direction.

The power transmission device 1A of the present embodiment has the following configuration.

(9) The power transmission device 1A has the motor 2.

The transmission mechanism 3A is connected downstream of the motor 2.

Since there is a tendency for the output torque to decrease as the motor 2 goes to higher rotation speed, this configuration that can reduce friction when in high gear speed is particularly suitable for power transmission devices using a motor as the drive source.

Figure 7:
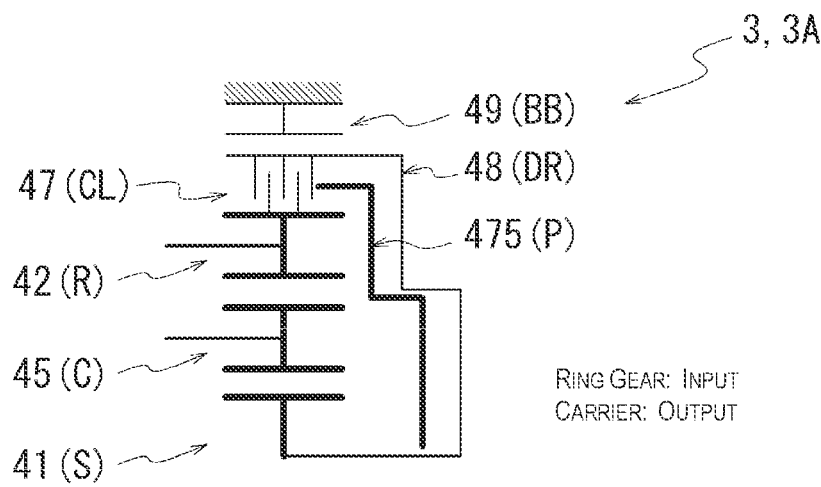
FIG. 7 is a skeleton diagram schematically showing the configuration of the transmission mechanism.

FIG. 7 is a skeleton diagram schematically showing the configuration of the transmission mechanism.

FIG. 8 to FIG. 11 are skeleton diagrams for explaining modification examples of the transmission mechanism.

With the explanation hereafter, code "S" means the sun gear 41 of the planetary gear 4, code "R" means the ring gear 42 and code "C" means the carrier 45.

Also, code "BB" means the band brake 49, code "CL" means the clutch 47, code "P" means the piston 475, code "DR" means the clutch drum 48, and code "HB" means the hub.

The transmission mechanisms 3, 3A noted above can be shown as in FIG. 7.

With the transmission mechanisms 3, 3A noted above, examples were shown of cases when the planetary gear set 4 is a single pinion having one pinion gear 43.

With the transmission mechanisms 3, 3A, the ring gear 42 (R) of the planetary gear set 4 is the rotation input unit, and the carrier 45 (C) is the output unit. Also, the clutch 47 (CL), the ring gear 42 (R), and the sun gear (S) are engaged to not be able to rotate relatively, and the band brake 49 (BB) fixes the sun gear 41 (S) linked to the clutch drum 48 (DR).

The transmission mechanism to which the power transmission device of the invention of this case can be applied is not limited to only these modes.

Following, examples of modes of the transmission mechanism to which this can be applied are shown using FIG. 8 to FIG. 11.

Figure 8:
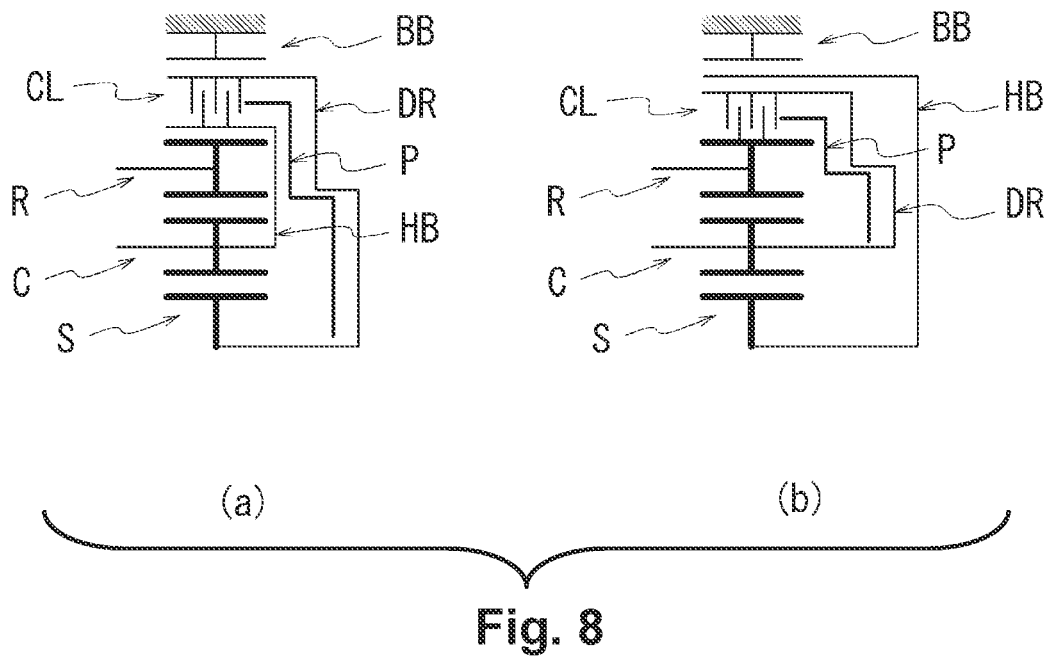
FIG. 8 includes skeleton diagrams for explaining modification examples of the transmission mechanism.

For example, when fixing the rotation of the sun gear S with the band brake BB with a single pinion, the modes shown in FIGS. 8 (*a*), (*b*) are also possible.

With the mode in FIG. 8 (*a*), the ring gear R of the planetary gear set is the rotation input unit, the carrier C is the output unit, and the band brake BB fixes the sun gear S linked to the clutch drum DR. The clutch CL engages the sun gear S linked to the clutch drum DR, and the carrier C linked to the hub HB so they are not able to rotate relatively.

With the mode in FIG. 8 (*b*), the ring gear R of the planetary gear set is the rotation input unit, the carrier C is the output unit, and the band brake BB fixes the sun gear S linked to the hub HB. The clutch CL engages the ring gear R, and the carrier C linked to the clutch drum DR so they are not able to rotate relatively.

Figure 9:
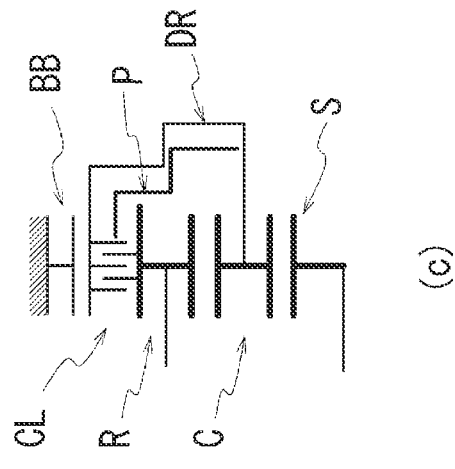
FIG. 9 includes skeleton diagrams for explaining modification examples of the transmission mechanism.
Figure 9:
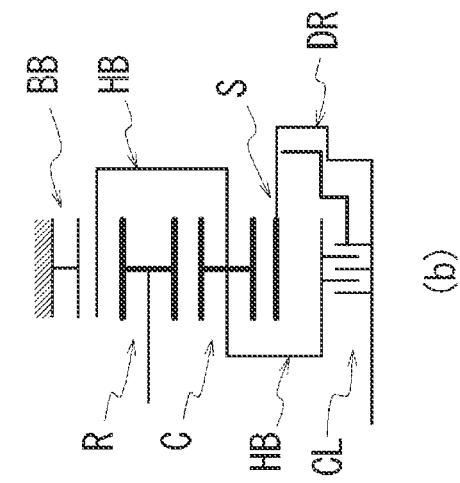
Figure 9:
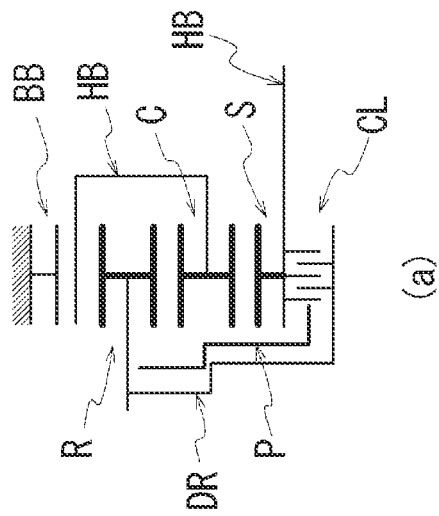
Figure 9:
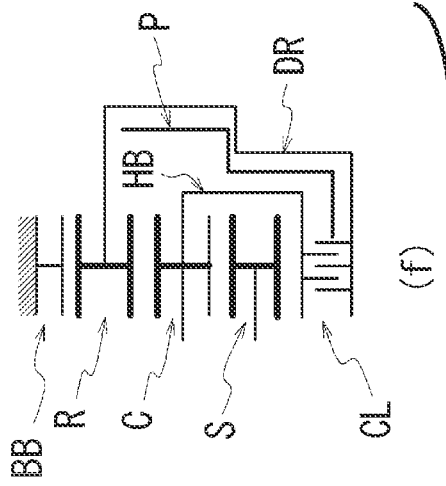
Figure 9:
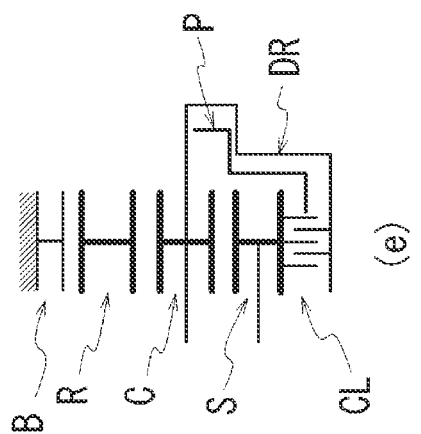
Figure 9:
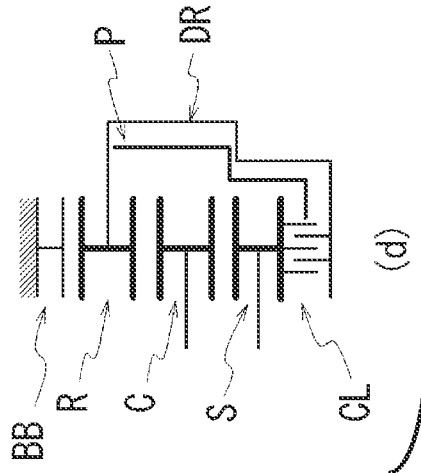

Also, when fixing the rotation of the carrier C with the band brake BB using a single pinion, the modes shown in FIG. 9 (*a*), (*b*), (*c*) are also possible.

With the mode of FIG. 9 (*a*), the sun gear S of the planetary gear set is the rotation input unit, the ring gear R is the output unit, and the band brake BB fixes the carrier C linked to the hub HB. The clutch CL engages the sun gear S, and the ring gear R linked to the clutch drum DR so they are not able to rotate relatively.

With the mode of FIG. 9 (b), the sun gear S of the planetary gear set is the rotation input unit, the ring gear R is the output unit, and the band brake BB fixes the carrier C linked to the hub HB. The clutch CL engages the sun gear S linked to the clutch drum DR, and the carrier C linked to the hub HB so they are not able to rotate relatively.

With the mode of FIG. 9 (c), the sun gear S of the planetary gear set is the rotation input unit, the ring gear R is the output unit, and the band brake BB fixes the carrier C linked to the clutch drum DR. The clutch CL engages the carrier C linked to the clutch drum DR, and the ring gear R so they are not able to rotate relatively.

Also, when fixing the rotation of the ring gear R with the band brake BB using a single pinion, the modes shown in FIG. 9 (d), (e), (f) are also possible.

With the mode of FIG. 9 (d), the sun gear S of the planetary gear set is the rotation input unit, the carrier C is the output unit, and the band brake BB fixes the ring gear R. The clutch CL engages the sun gear S, and the ring gear R linked to the clutch drum DR so they are not able to rotate relatively.

With the mode of FIG. 9 (e), the sun gear S of the planetary gear set is the rotation input unit, the carrier C is the output unit, and the band brake BB fixes the ring gear R. The clutch CL engages the sun gear S, and the carrier C linked to the clutch drum DR so they are not able to rotate relatively.

With the mode of FIG. 9 (f), the sun gear S of the planetary gear set is the rotation input unit, the carrier C is the output unit, and the band brake BB fixes the ring gear R. The clutch CL engages the ring gear R linked to the clutch drum DR, and the carrier C linked to the hub HB so they are not able to rotate relatively.

Figure 10:
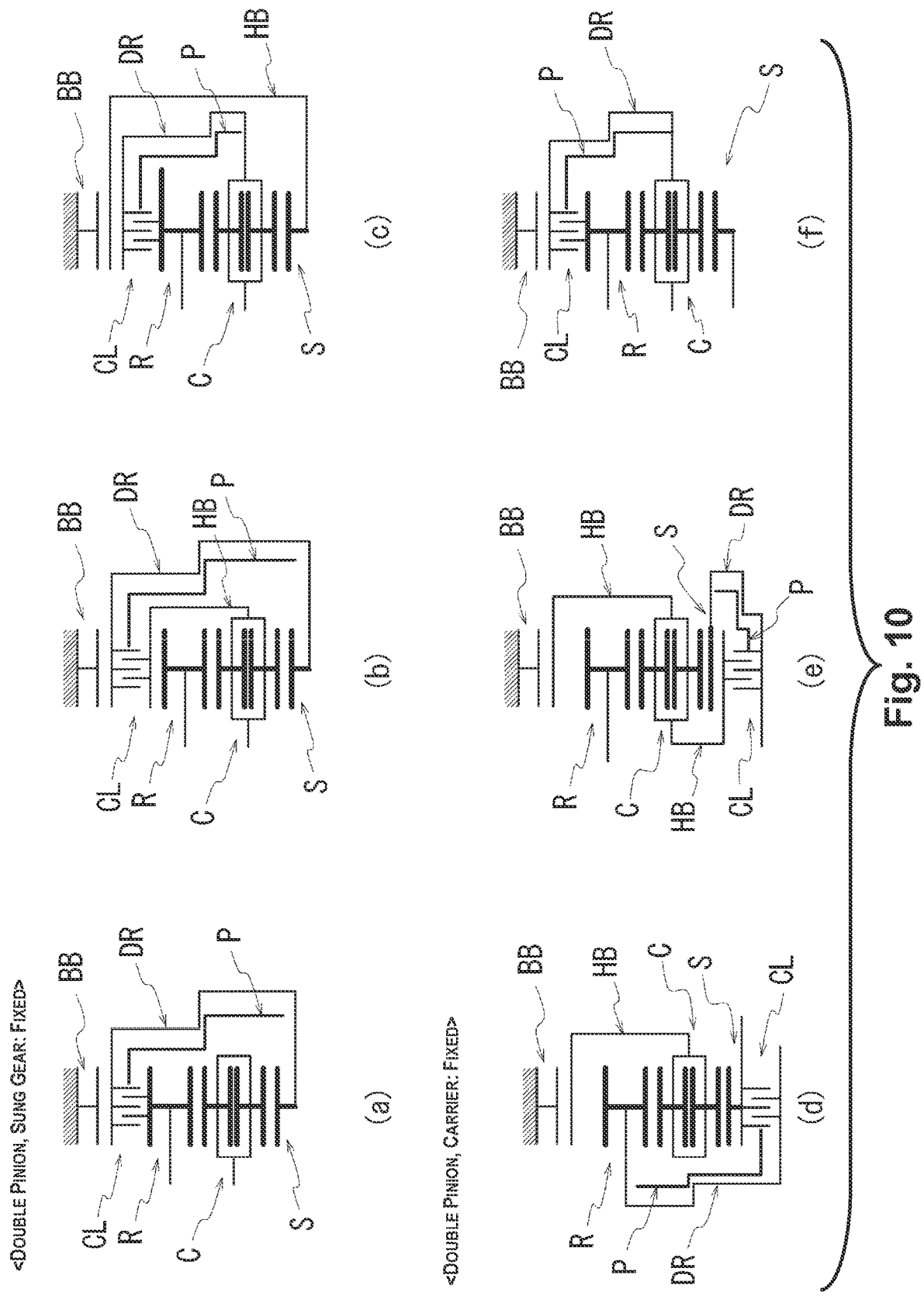
FIG. 10 includes skeleton diagrams for explaining modification examples of the transmission mechanism.

Also, when fixing the rotation of the sun gear S with the band brake BB using a double pinion, the modes shown in FIG. 10 (a), (b), (c) are also possible.

With the mode of FIG. 10 (a), the carrier C of the planetary gear set is the rotation input unit, the ring gear R is the output unit, and the band brake BB fixes the sun gear S linked to the clutch drum DR. The clutch CL engages the ring gear R, and the sun gear S linked to the clutch drum DR so they are not able to rotate relatively.

With the mode of FIG. 10 (b), the carrier C of the planetary gear set is the rotation input unit, the ring gear R is the output unit, and the band brake BB fixes the sun gear S linked to the clutch drum DR. The clutch CL engages the sun gear S linked to the clutch drum DR, and the carrier C linked to the hub HB so they are not able to rotate relatively.

With the mode of FIG. 10 (c), the carrier C of the planetary gear set is the rotation input unit, the ring gear R is the output unit, and the band brake BB fixes the sun gear S linked to the hub HB. The clutch CL engages the carrier C linked to the clutch drum DR, and the ring gear R so they are not able to rotate relatively.

Also, when fixing the rotation of the carrier C with the band brake BB using a double pinion, the modes shown in FIG. 10 (d), (e), (f) are also possible.

With the mode of FIG. 10 (d), the sun gear S of the planetary gear set is the rotation input unit, the ring gear R is the output unit, and the band brake BB fixes the carrier C linked to the hub HB. The clutch CL engages the sun gear S, and the ring gear R linked to the clutch drum DR so they are not able to rotate relatively.

With the mode of FIG. 10 (e), the sun gear S of the planetary gear set is the rotation input unit, the ring gear R is the output unit, and the band brake BB fixes the carrier C linked to the hub HB. The clutch CL engages the sun gear S linked to the clutch drum DR, and the carrier C linked to the hub HB so they are not able to rotate relatively.

With the mode of FIG. 10 (f), the sun gear S of the planetary gear set is the rotation input unit, the ring gear R is the output unit, and the band brake BB fixes the carrier C linked to the clutch drum DR. The clutch CL engages the carrier C linked to the clutch drum DR, and the ring gear R so they are not able to rotate relatively.

Figure 11:
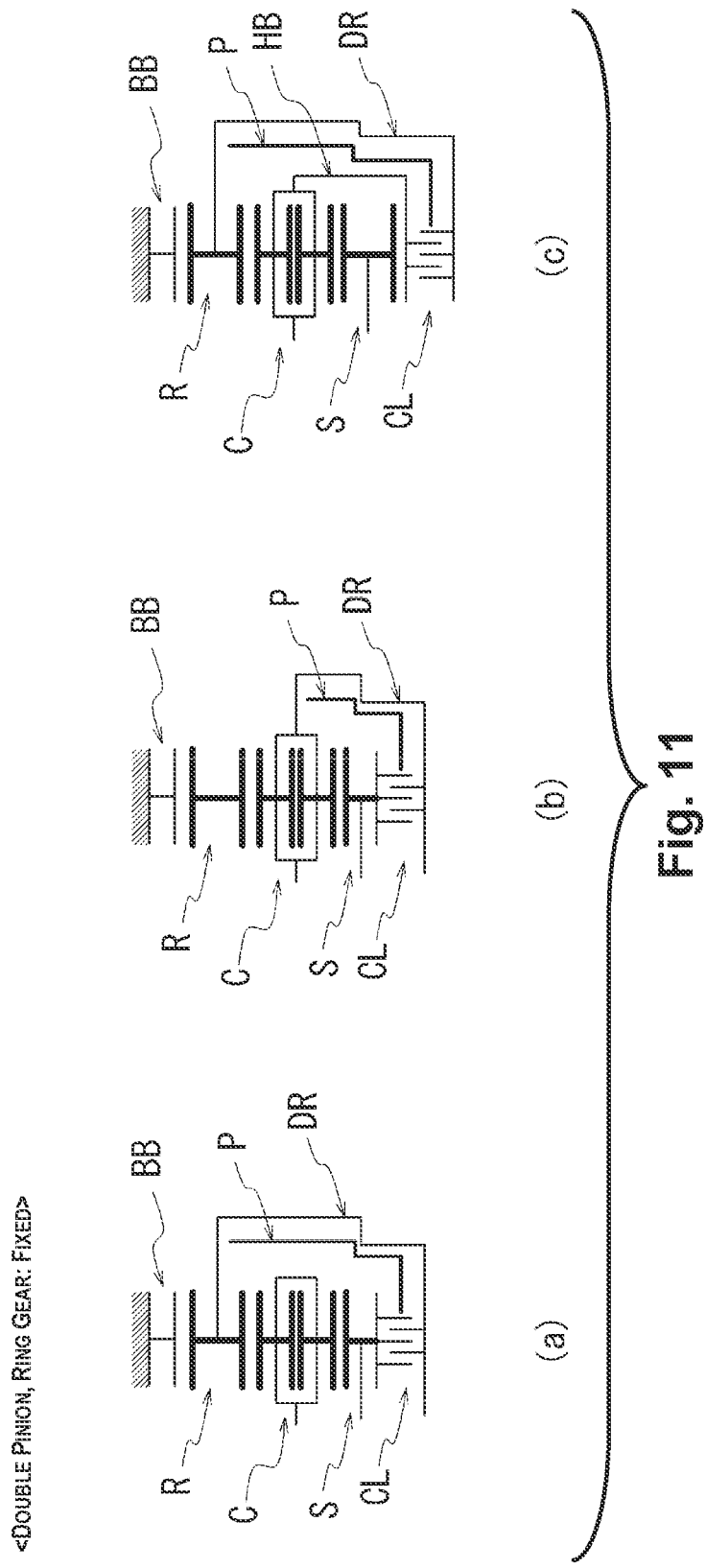
FIG. 11 includes skeleton diagrams for explaining modification examples of the transmission mechanism.

Also, when fixing the rotation of the ring gear R with the band brake BB using a double pinion, the modes shown in FIG. 11 (a), (b), (c) are also possible.

With the mode of FIG. 11 (a), the sun gear S of the planetary gear set is the rotation input unit, the carrier C is the output unit, and the band brake BB fixes the ring gear R. The clutch CL engages the sun gear S, and the ring gear R linked to the clutch drum DR so they are not able to rotate relatively.

With the mode of FIG. 11 (b), the sun gear S of the planetary gear set is the rotation input unit, the carrier C is the output unit, and the band brake BB fixes the ring gear R. The clutch CL engages the carrier C linked to the clutch drum DR, and the sun gear S so they are not able to rotate relatively.

With the mode of FIG. 11 (c), the sun gear S of the planetary gear set is the rotation input unit, the carrier C is the output unit, and the band brake BB fixes the ring gear R. The clutch CL engages the carrier C linked to the hub HB, and the ring gear R linked to the clutch drum DR so they are not able to rotate relatively.

Above, in FIG. 7 to FIG. 11, examples of a total of 18 patterns were shown for the possible modes of the transmission mechanism.

Of this total of 18 patterns, with the mode shown in FIG. 7, the mode shown in FIG. 9 (e), the mode shown in FIG. 10 (a), and the mode shown in FIG. 10 (f), it is possible to switch between low gear speed and high gear speed with the output rotation of the motor 2 kept as is in the forward rotation direction.

Also, with the mode shown in FIG. 7, and the mode of FIG. 10 (a), the outer diameter of the clutch drum DR is the largest, so it is possible to have the clutch CL in an engaged state while keeping a margin.

Also, the clutch CL that engages with two elements of the constitutional elements of the planetary gear set (sun gear S, ring gear R, and carrier C) can be provided anywhere in the transmission mechanism.

For example, as with the modes shown in FIG. 8 (a), (b), and FIG. 9 (c), it is possible to provide the clutch CL between the band brake BB and the ring gear R.

With the clutch CL shown in FIG. 8 (a), between the band brake BB and the ring gear R, the clutch drum DR linked to the sun gear R is provided at the outer diameter side, the hub HB linked to the carrier C is provided at the inner diameter side, and the carrier C and the sun gear S are engaged.

With the clutch CL shown in FIG. 8 (b), between the band brake BB and the ring gear R, the hub HB linked to the sun gear S is provided at the outer diameter side, the clutch drum DR linked to the carrier C is provided at the inner diameter side, and the carrier C and the ring R are engaged.

With the clutch CL shown in FIG. 9 (c), between the band brake BB and the ring gear R, the clutch drum DR fixed to the carrier C is provided at the outer diameter side of the ring gear R, and the carrier C and the ring gear R are engaged.

Furthermore, for example as with the modes shown in FIGS. 9 (*a*), (*b*), and (*d*) to (*f*), the clutch may also be provided at the inner diameter side of the sun gear S.

With the clutch CL shown in FIG. 9 (*a*), the clutch drum DR linked to the ring gear R is provided at the inner diameter side of the sun gear S, and the sun gear S and the ring gear R are engaged.

With the clutch CL shown in FIG. 9 (*b*), the hub HB linked to the carrier C is provided at the outer diameter side of the clutch drum DR linked to the sun gear S, and the sun gear S and the carrier C are linked.

With the clutch CL shown in FIG. 9 (*d*), the clutch drum DR linked to the ring gear R is provided at the inner diameter side of the sun gear S, and the sun gear S and the ring gear R are linked.

With the clutch CL shown in FIG. 9 (*e*), the clutch drum DR linked to the carrier C is provided at the inner diameter side of the sun gear S, and the sun gear S and the carrier C are linked.

With the clutch CL shown in FIG. 9 (*f*), the hub HB linked to the carrier C is provided at the inner diameter side of the sun gear S, and the clutch drum DR linked to the ring gear R is provided at the inner diameter side of the hub HB, and the carrier C and the ring gear R are linked.

In this way, the clutch CL may be provided at either of the outer diameter side of the ring gear R, and the inner diameter side of the sun gear S.

The same is also true for the double pinion having two pinion gears.

As shown in FIG. 10 (*a*), (*b*), (*c*), and (*f*), the clutch CL may also be provided on the outer diameter side of the ring gear R.

With the clutch CL shown in FIG. 10 (*a*), the clutch drum DR linked to the sun gear S is provided at the outer diameter side of the ring gear R, and the sun gear S and the ring gear R are engaged.

With the clutch CL shown in FIG. 10 (*b*), the hub HB linked to the carrier C is provided at the outer diameter side of the ring gear R, and the clutch drum DR linked to the sun gear S is provided at the outer diameter side of the hub HB, and the sun gear S and the carrier C are linked.

With the clutch CL shown in FIG. 10 (*c*), the clutch drum DR linked to the carrier C is provided at the outer diameter side of the ring gear R, and the hub HB linked to the sun gear S is provided on the outer diameter side of the clutch drum DR, and the sun gear S and the carrier C are linked.

With the clutch CL shown in FIG. 10 (*f*), the clutch drum DR linked to the carrier C is provided at the outer diameter side of the ring gear R, and the ring gear R and the carrier C are linked.

As shown in FIGS. 10 (*d*) and (*e*), and FIGS. 11 (*a*), (*b*), and (*c*), the clutch CL may also be provided on the inner diameter side of the sun gear S.

With the clutch CL shown in FIG. 10 (*d*), the clutch drum DR linked to the ring gear R is provided at the inner diameter side of the sun gear S, and the sun gear S and the ring gear R are linked.

With the clutch CL shown in FIG. 10 (*e*), the clutch drum DR linked to the sun gear S is provided at the inner diameter side of the sun gear S, and the hub HB linked to the carrier C is provided at the outer diameter side of the clutch drum DR, and the sun gear S and the carrier C are linked.

With the clutch CL shown in FIG. 11 (*a*), the clutch drum DR linked to the ring gear R is provided at the inner diameter side of the sun gear S, and the sun gear S and the ring gear R are linked.

With the clutch CL shown in FIG. 11 (*b*), the clutch drum DR linked to the carrier C is provided at the inner diameter side of the sun gear S, and the sun gear S and the carrier C are linked.

With the clutch CL shown in FIG. 11 (*c*), at the inner diameter side of the sun gear S, the hub HB linked to the carrier C is provided at the outer diameter side, and the clutch drum DR linked to the ring gear R is provided at the inner diameter side of the hub HB, and the carrier C and the ring gear R are linked.

With the mode shown in FIG. 9 (*c*), and the mode shown in FIG. 11 (*b*), for switching between the low gear speed and the high gear speed, it is necessary to reverse the direction of the output rotation of the motor 2.

Here, the term "connected downstream" in this specification means being in a connection relationship in which the power is transmitted from the components arranged upstream to the components arranged downstream.

For example, in the case of the transmission mechanism 3 connected downstream of the motor 2, this means that the power is transmitted from the motor 2 to the transmission mechanism 3.

Also, the term "directly connected" in this specification means that the members are connected with the ability to transmit power to each other without the interposition of another member by which the reduction ratio is converted such as a reduction mechanism, an acceleration mechanism, a transmission mechanism, etc.

Above, embodiments of the invention of the present application were explained, but the invention of the present application is not limited to only the modes shown in these embodiments. Changes can be made as appropriate within the scope of the technical concept of the invention.

The invention claimed is:

1. A power transmission device comprising:
   a transmission mechanism having
      a planetary gear set,
      a first engagement element that is a band brake configured to be engaged when the transmission mechanism is in a low gear speed, and
      a second engagement element that is a multi-plate friction clutch configured to be engaged when the transmission mechanism is in a high gear speed, the multi-plate friction clutch including a driven plate, a drive plate, and a piston; and
   a motor arranged upstream of the transmission mechanism, wherein
   the driven plate, the drive plate, and the piston of the multi-plate friction clutch overlap the band brake and the planetary gear set in the radial direction,
   at least one of the driven plate and the drive plate of the multi-plate friction clutch is arranged on a radially outward side of a ring gear of the planetary gear set,
   the transmission mechanism is a two-speed transmission mechanism,
   an output rotation of the transmission mechanism in the high gear speed and an output rotation of the transmission mechanism in the low gear speed are in the same rotational direction, and
   a rotational direction of an output rotation of the transmission mechanism is switched between forward and reverse by switching a rotational direction of the motor.

2. The power transmission device according to claim 1, wherein
   the band brake overlaps with the planetary gear set in the radial direction.

3. The power transmission device according to claim 1, further comprising:
   a differential device arranged downstream of the transmission mechanism, and
   a drive shaft arranged downstream of the differential device, wherein
   the motor, the transmission mechanism and the differential device overlap in an axial direction, and
   the drive shaft penetrates the motor and the transmission mechanism.

\* \* \* \* \*